United States Patent
Zhang

(10) Patent No.: US 12,336,036 B2
(45) Date of Patent: Jun. 17, 2025

(54) COMMUNICATION METHODS AND APPARATUSES FOR REDUCING REPORTING OVERHEAD

(71) Applicant: HUAWEI TECHNOLOGIES CO., LTD., Guangdong (CN)

(72) Inventor: Di Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 591 days.

(21) Appl. No.: 17/591,045

(22) Filed: Feb. 2, 2022

(65) Prior Publication Data
US 2022/0159767 A1    May 19, 2022

Related U.S. Application Data

(63) Continuation of application No. PCT/CN2020/105763, filed on Jul. 30, 2020.

(30) Foreign Application Priority Data

Aug. 2, 2019 (CN) .......................... 201910713406.7

(51) Int. Cl.
*H04W 76/18* (2018.01)
*H04L 1/00* (2006.01)
(Continued)

(52) U.S. Cl.
CPC ........... *H04W 76/18* (2018.02); *H04L 1/0011* (2013.01); *H04L 5/0053* (2013.01); *H04W 24/10* (2013.01)

(58) Field of Classification Search
CPC .... H04B 7/0695; H04B 7/088; H04B 7/0617; H04W 76/19; H04W 76/18; H04W 16/28;
(Continued)

(56) References Cited

U.S. PATENT DOCUMENTS

| 9,042,315 B2 | 5/2015 | Lin et al. |
| 2019/0037604 A1 | 1/2019 | Akkarakaran et al. |

(Continued)

FOREIGN PATENT DOCUMENTS

| CN | 103379517 A | 10/2013 |
| CN | 109478918 A | 3/2019 |

(Continued)

OTHER PUBLICATIONS

3GPP TS 38.321 V15.6.0 (Jun. 2019), 3rd Generation Partnership Project; Technical Specification Group Radio Access Network; NR; Medium Access Control (MAC) protocol specification(Release 15), 78 pages.

Office Action issued in Chinese Application No. 201910713406.7 on Sep. 7, 2021, 14 pages (with English translation).

PCT International Search Report and Written Opinion issued in International Application No. PCT/CN2020/105763 on Oct. 22, 2020, 17 pages (with English translation).

(Continued)

*Primary Examiner* — Allahyar Kasraian
(74) *Attorney, Agent, or Firm* — Fish & Richardson P.C.

(57) ABSTRACT

This application provides communication methods and apparatuses. In one implementation, a method includes: determining, based on performing beam failure detection, a link failure in at least one cell; and sending indication information, wherein the indication information indicates information about the at least one cell having the link failure, wherein a format of the indication information is determined based on a situation of the at least one cell having the link failure.

25 Claims, 10 Drawing Sheets

(51) Int. Cl.
*H04L 5/00* (2006.01)
*H04W 24/10* (2009.01)

(58) Field of Classification Search
CPC ... H04W 72/046; H04W 24/10; H04L 1/0011; H04L 5/0053
See application file for complete search history.

(56) References Cited

U.S. PATENT DOCUMENTS

| | | | |
|---|---|---|---|
| 2019/0190582 A1 | 6/2019 | Guo et al. | |
| 2020/0178338 A1* | 6/2020 | Ahn | H04B 7/0617 |
| 2021/0127356 A1* | 4/2021 | Agiwal | H04W 72/23 |
| 2022/0167197 A1* | 5/2022 | Li | H04B 7/0691 |
| 2022/0224393 A1* | 7/2022 | Gao | H04W 76/19 |

FOREIGN PATENT DOCUMENTS

| | | |
|---|---|---|
| CN | 109842940 A | 6/2019 |
| CN | 110034799 A | 7/2019 |
| CN | 110062397 A | 7/2019 |
| WO | 2019032882 A1 | 2/2019 |
| WO | 2019135654 A1 | 7/2019 |

OTHER PUBLICATIONS

3GPP TS 38.331 V15.6.0 (Jun. 2019), "3rd Generation Partnership Project; Technical Specification Group Radio Access Network; NR; Radio Resource Control (RRC) protocol specification (Release 15)," Jun. 2019, 519 pages.

Extended European Search Report issued in European Application No. 20850580.0 on Jul. 25, 2022, 14 pages.

Huawei, HiSilicon, "MAC CE format design for SCell BFRQ," 3GPP TSG-RAN WG2 Meeting #107, R2-1910941, Prague, Czech Republic, Aug. 26-30, 2019, 3 pages.

Nokia et al., "Enhancements on Multi-beam Operation," 3GPP TSG RAN WG1 #97 Meeting, R1-1907317, Reno, USA, May 13-17, 2019, 20 pages.

Office Action issued in Indian Application No. 202227008434 on Jul. 21, 2022, 6 pages.

Qualcomm Incorporated, "Enhancements to Multi-beam Operation," 3GPP TSG-RAN WG1 Meeting #96, R1-1903044, Athens, Greece, Feb. 25-Mar. 1, 2019, 19 pages.

Extended European Search Report in European Appln. No. 20850580.0, mailed on Feb. 18, 2025, 10 pages.

* cited by examiner

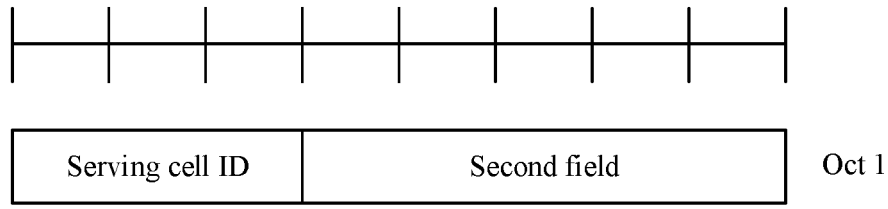
FIG. 10
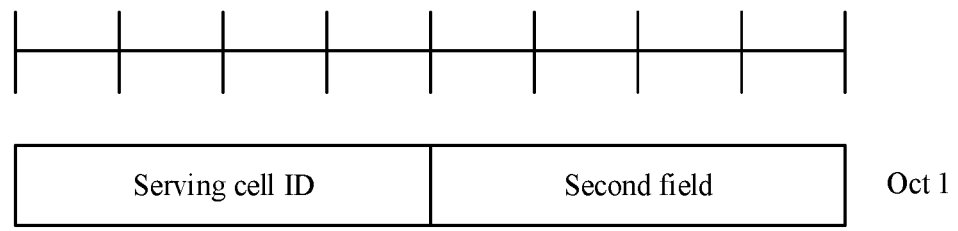
FIG. 11
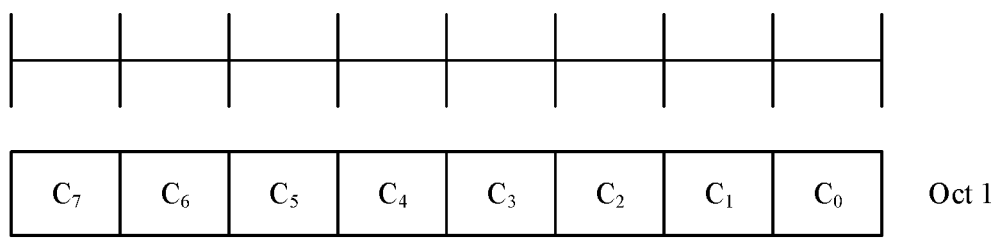
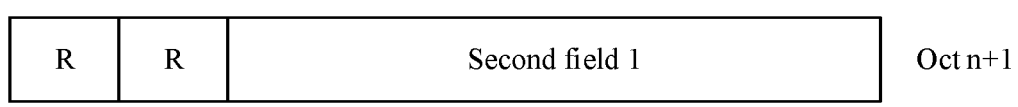
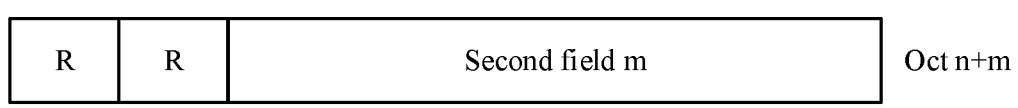
FIG. 12

COMMUNICATION METHODS AND APPARATUSES FOR REDUCING REPORTING OVERHEAD

CROSS-REFERENCE TO RELATED APPLICATIONS

This application is a continuation of International Application No. PCT/CN2020/105763, filed on Jul. 30, 2020, which claims priority to Chinese Patent Application No. 201910713406.7, filed on Aug. 2, 2019. The disclosures of the aforementioned applications are hereby incorporated by reference in their entireties.

TECHNICAL FIELD

This application relates to the communications field, and specifically, to a communication method and a communications apparatus.

BACKGROUND

In a communication process, a beam may be blocked. When the beam is blocked, a signal cannot continue to be transmitted. To prevent sudden communication interruption caused by beam blocking, a corresponding mechanism is introduced to detect beam quality and quickly recover a link in case of the beam blocking.

In a conventional technology, a terminal device performs beam failure detection. After determining that the beam fails, the terminal device sends beam failure recovery request (beam failure recovery request, BFRQ) information (which may also be referred to as link failure recovery request information) to a network device. The terminal device may indicate information such as cell information of a link failure cell to the network device by using the BFRQ information.

Before the terminal device sends the BFRQ information, the network device cannot learn of a quantity of cells in which a link failure occurs. Therefore, usually, a resource is reserved or an information format is designed based on a maximum quantity of cells in which a link failure may occur. This may cause a resource waste.

SUMMARY

This application provides a communication method and a communications apparatus, so that when a terminal device reports information about a link failure cell, a waste of resources for reporting can be reduced.

According to a first aspect, a communication method is provided. The communication method may be performed by a terminal device, or may be performed by a chip or a circuit configured in a terminal device. This is not limited in this application.

The communication method may include: determining that a link in at least one cell fails; and sending first indication information, where the first indication information indicates information about a link failure cell, and the first indication information is determined based on a situation of the link failure cell.

Optionally, that the first indication information is determined based on a situation of the link failure cell may be: the first indication information is directly determined based on the situation of the link failure cell, or the first indication information is indirectly determined based on the situation of the link failure cell.

That the first indication information indicates information about a link failure cell may be understood as: the first indication information includes the information about the link failure cell.

Optionally, the information about the link failure cell may include: identification information of the link failure cell and/or reference signal information, where the reference signal information is used to recover a link in the link failure cell. The reference signal information may include an index of a reference signal resource and/or channel quality (for example, one or more of the following: RSRP, an SINR, RSRQ, a CQI, or an SNR) of a reference signal. For example, the reference signal resource may include a CSI-RS resource and/or an SSB resource. The reference signal information may be understood as reference signal resource information. The reference signal resource information includes an index of a reference signal resource and/or channel quality (for example, one or more of the following: RSRP, an SINR, RSRQ, a CQI, or an SNR) of a reference signal on the reference signal resource.

Based on the foregoing solution, the first indication information sent by the terminal device, that is, the first indication information indicating the cell information of the link failure cell, may be generated based on the situation of the link failure cell. For example, the format of the first indication information to be sent is determined based on the situation of the link failure cell. In other words, an information format of a variable length is designed to indicate the information about the link failure cell, so that the terminal device can adaptively adjust a size or a format of the first indication information sent by the terminal device, thereby effectively reducing reporting times of redundant information, and reducing reporting overheads. For another example, a resource for carrying the first indication information is determined based on the situation of the link failure cell, so that the resource for carrying the first indication information can be properly allocated, thereby reducing a resource waste and improving resource utilization.

With reference to the first aspect, in some implementations of the first aspect, before the sending first indication information, the communication method further includes: sending second indication information on a corresponding second resource based on the situation of the link failure cell, where the second indication information indicates a cell link failure.

Optionally, that the first indication information is determined based on a situation of the link failure cell may be: the first indication information is indirectly determined based on the situation of the link failure cell. For example, the first indication information may be determined based on content of the second indication information, or the first indication information may be determined based on the second resource for carrying the second indication information.

Optionally, there is a correspondence between a plurality of second resources and situations of a link failure cell. The terminal device selects, based on the situation of the link failure cell and with reference to the correspondence, an appropriate second resource for sending the second indication information. The correspondence may be pre-specified, for example, preconfigured by a network device or pre-specified in a protocol. This is not limited.

Optionally, that the second indication information indicates a cell link failure may be represented as: the second indication information indicates the network device that a cell link failure occurs, or the second indication information may indicate a situation of a cell link failure to the network device.

Optionally, that the second indication information indicates a cell link failure may be represented as: the second indication information indicates a link in at least one of L cells fails, where L is an integer greater than 1.

Optionally, that the second indication information indicates a cell link failure may be represented as: the second indication information indicates cell identifiers of N cells in which a link failure occurs.

Based on the foregoing solution, the terminal device sends the second indication information on the corresponding second resource based on the situation of the link failure cell, so that the network device can also learn of the situation of the link failure cell based on the second resource.

With reference to the first aspect, in some implementations of the first aspect, the second indication information is used to request a first resource for carrying the first indication information.

Based on the foregoing solution, the terminal device sends the second indication information on the corresponding second resource based on the situation of the link failure cell, so that the network device can also allocate the first resource of an appropriate size to the terminal device based on the second resource, thereby effectively reducing resource overheads and improving resource utilization.

It should be understood that, when the terminal device requests the network device to allocate the first resource herein, it indicates that the terminal device requests the network device to allocate a resource for carrying the first indication information, but does not mean that the terminal device requests a specific resource.

With reference to the first aspect, in some implementations of the first aspect, the communication method further includes: sending second indication information on a third resource, where the second indication information is used to request a first resource for carrying the first indication information.

Optionally, the third resource may be a resource divided for the terminal device in advance, and is used by the terminal device to notify the network device that a cell link failure occurs.

Based on the foregoing solution, the terminal device may alternatively request, by using the content of the second indication information, the network device to allocate the first resource for carrying the first indication information. For example, when a cyclic shift of a sequence of the second indication information is a first cyclic shift, a relatively small first resource may be allocated to the terminal device; when a cyclic shift of a sequence of the second indication information is a second cyclic shift, a relatively large first resource may be allocated to the terminal device. For another example, when a state value of the second indication information is a first value, a relatively small first resource may be allocated to the terminal device; when a state value of the second indication information is a second value, a relatively large first resource may be allocated to the terminal device.

With reference to the first aspect, in some implementations of the first aspect, before the sending first indication information, the communication method further includes: receiving third indication information, where the third indication information indicates the first resource for carrying the first indication information.

It should be understood that when the network device allocates the first resource to the terminal device, it indicates that the network device allocates, to the terminal device, a resource for carrying the first indication information, or may indicate a particular resource.

With reference to the first aspect, in some implementations of the first aspect, the first resource carries the first indication information in a corresponding format.

In other words, the first indication information in the corresponding format is sent on the first resource.

Optionally, there is a correspondence between the format of the first indication information and the resource that is allocated by the network device and that is for carrying the first indication information. For example, when the network device allocates a relatively small resource to carry the first indication information, the format of the first indication information is a short format; when the network device allocates a relatively large resource to carry the first indication information, the format of the first indication information is a long format. Details are described in the following embodiments.

Based on the foregoing solution, the information format of the variable length may be designed to indicate the information about the link failure cell, and the first indication information in the corresponding format is sent on the first resource, so that a resource waste can be reduced.

With reference to the first aspect, in some implementations of the first aspect, that the first indication information is determined based on a situation of the link failure cell includes: a format of the first indication information is determined based on the situation of the link failure cell; and/or a resource for carrying the first indication information is determined based on the situation of the link failure cell.

Based on the foregoing solution, an information format of a variable length may be designed to indicate the information about the link failure cell, and the first indication information in an appropriate format is selected based on the situation of the link failure cell, so that a resource waste can be reduced. In addition, based on the situation of the link failure cell, a resource of an appropriate size may alternatively be used to carry the first indication information, so as to improve resource utilization and reduce a resource waste.

With reference to the first aspect, in some implementations of the first aspect, the format of the first indication information is the first format or the second format, where the first format and the second format meet one or more of the following: a quantity of bits occupied by the first indication information in the first format is less than a quantity of bits occupied by the first indication information in the second format; the first indication information in the first format indicates information about N1 link failure cells, and the first indication information in the second format indicates information about N2 link failure cells, where N1 and N2 are integers greater than or equal to 1, and N1<N2; or a payload of information included in the first indication information in the first format is less than a payload of information included in the first indication information in the second format.

The quantity of bits, the quantity of pieces of information about the link failure cell, and the payload may each be a maximum value. For example, the quantity of bits occupied by the first indication information in the first format indicates a maximum quantity of bits of the first indication information that can be sent in the format.

With reference to the first aspect, in some implementations of the first aspect, the format of the first indication information is the first format, and the first indication information in the first format includes one or more of the following information: a serving cell identifier field, a first field, or a second field, where the serving cell identifier field indicates an identifier of the link failure cell by using a state value, the first field indicates whether the link failure cell indicated by the serving cell identifier field has a corresponding second field, and the second field indicates reference signal information used to recover a link in the link failure cell indicated by the serving cell identifier field.

It should be understood that, that the serving cell identifier field indicates a link failure cell may be: the serving cell identifier field indicates one, but not limited to one herein, or more link failure cells.

Optionally, each cell indicated by the serving cell ID field may have a corresponding first field. For example, the link failure cell includes a first cell and a second cell, and the serving cell identifier field is used to indicate that a link failure occurs in the first cell and the second cell. A first field corresponding to the first cell indicates whether the first cell has a second field, and a first field corresponding to the second cell indicates whether the second cell has a second field.

With reference to the first aspect, in some implementations of the first aspect, the format of the first indication information is the second format, and the first indication information in the second format includes one or more of the following information: a serving cell identifier field, a first field, or a second field, where the serving cell identifier field indicates an identifier of the link failure cell by using a bitmap, the first field indicates whether the link failure cell indicated by the serving cell identifier field has a corresponding second field, and the second field indicates reference signal information used to recover a link in the link failure cell indicated by the serving cell identifier field.

With reference to the first aspect, in some implementations of the first aspect, if the situation of the link failure cell satisfies a preset condition, the first indication information indicates an identifier of the link failure cell by using a state value; and/or if the situation of the link failure cell does not meet the preset condition, the first indication information indicates the identifier of the link failure cell by using a bitmap.

With reference to the first aspect, in some implementations of the first aspect, the preset condition includes: a quantity of link failure cells is less than or equal to a preset first threshold, or a valid payload of the information about the link failure cell is less than or equal to a preset second threshold.

Optionally, the preset first threshold or the preset second threshold may be predefined, for example, predefined in a protocol or by the network device, or may be configured by the network device for the terminal device, or may be an empirical value, or the like. This is not limited.

With reference to the first aspect, in some implementations of the first aspect, the situation of the link failure cell includes: a quantity of link failure cells and/or a valid payload of the information about the link failure cell.

Based on the foregoing solution, the first indication information used to report the information about the link failure cell may be determined based on one or more of the following: the quantity of link failure cells, the payload (payload) of the information about the link failure cell, and whether a situation of the reference signal used to recover the link failure cell is identified.

According to a second aspect, a communication method is provided. The communication method may be performed by a terminal device, or may be performed by a chip or a circuit configured in a terminal device. This is not limited in this application.

The communication method may include: determining that a link in at least one cell fails; determining a format of first indication information based on a situation of a link failure cell, where the first indication information indicates information about the link failure cell; and sending the first indication information.

Optionally, the determining a format of first indication information based on a situation of a link failure cell may be: directly determining, by the terminal device, the format of the first indication information based on the situation of the link failure cell; or indirectly determining, by the terminal device, the format of the first indication information based on the situation of the link failure cell.

Based on the foregoing technical solution, an information format of a variable length may be designed to indicate the information about the link failure cell, and the first indication information in an appropriate format is selected based on the situation of the link failure cell, so that a resource waste can be reduced.

With reference to the second aspect, in some implementations of the second aspect, the first resource carries the first indication information in a corresponding format.

In other words, the first indication information in the corresponding format is sent on the first resource.

With reference to the second aspect, in some implementations of the second aspect, the format of the first indication information is the first format or the second format, where the first format and the second format meet one or more of the following: a quantity of bits occupied by the first indication information in the first format is less than a quantity of bits occupied by the first indication information in the second format; the first indication information in the first format indicates information about N1 link failure cells, and the first indication information in the second format indicates information about N2 link failure cells, where N1 and N2 are integers greater than or equal to 1, and N1<N2; or a payload of information included in the first indication information in the first format is less than a payload of information included in the first indication information in the second format.

With reference to the second aspect, in some implementations of the second aspect, the format of the first indication information is the first format, and the first indication information in the first format includes one or more of the following information: a serving cell identifier field, a first field, or a second field, where the serving cell identifier field indicates an identifier of the link failure cell by using a state value, the first field indicates whether the link failure cell indicated by the serving cell identifier field has a corresponding second field, and the second field indicates reference signal information used to recover a link in the link failure cell indicated by the serving cell identifier field.

With reference to the second aspect, in some implementations of the second aspect, the format of the first indication information is the second format, and the first indication information in the second format includes one or more of the following information: a serving cell identifier field, a first field, or a second field, where the serving cell identifier field indicates an identifier of the link failure cell by using a bitmap, the first field indicates whether the link failure cell indicated by the serving cell identifier field has a corresponding second field, and the second field indicates reference signal information used to recover a link in the link failure cell indicated by the serving cell identifier field.

With reference to the second aspect, in some implementations of the second aspect, if the situation of the link failure cell satisfies a preset condition, the first indication information indicates an identifier of the link failure cell by using a state value; and/or if the situation of the link failure cell does not meet the preset condition, the first indication information indicates the identifier of the link failure cell by using a bitmap.

With reference to the second aspect, in some implementations of the second aspect, the preset condition includes: a quantity of link failure cells is less than or equal to a preset first threshold, or a valid payload of the information about the link failure cell is less than or equal to a preset second threshold.

With reference to the second aspect, in some implementations of the second aspect, the situation of the link failure cell includes: a quantity of link failure cells and/or a valid payload of the information about the link failure cell.

According to a third aspect, a communication method is provided. The communication method may be performed by a network device, or may be performed by a chip or a circuit configured in a network device. This is not limited in this application.

The communication method may include: receiving first indication information, where the first indication information indicates information about a link failure cell, and the first indication information is determined based on a situation of the link failure cell; and recovering a link in the link failure cell based on the first indication information.

Optionally, a quantity of link failure cells that are reported by a terminal device may be greater than or equal to a quantity of link failure cells that are recovered by the network device. In other words, if the terminal device reports that a link failure occurs in a plurality of cells, the network device may recover links in some or all of the plurality of cells.

With reference to the third aspect, in some implementations of the third aspect, before the receiving first indication information, the communication method further includes: receiving second indication information, where the second indication information indicates a cell link failure; and determining, based on the second indication information or a second resource for carrying the second indication information, a first resource for carrying the first indication information.

Optionally, the second indication information or the second resource for carrying the second indication information is determined based on the situation of the link failure cell.

Optionally, the determining, based on the second indication information or a second resource for carrying the second indication information, a first resource for carrying the first indication information may include: allocating, by the network device to the terminal device based on the second indication information or the second resource for carrying the second indication information, a resource that is of an appropriate size and that is for carrying the first indication information.

Optionally, the determining, based on the second indication information or a second resource for carrying the second indication information, a first resource for carrying the first indication information may include: activating, by the network device based on the second indication information or the second resource for carrying the second indication information, a resource for carrying the first indication information. The resource for carrying the first indication information may be a resource activated by response information of the second indication information.

Optionally, the determining, based on the second indication information or a second resource for carrying the second indication information, a first resource for carrying the first indication information may include: preconfiguring a plurality of resources for carrying the second indication information and a plurality of resources for carrying the first indication information, and an association relationship between the plurality of resources for carrying the second indication information and the plurality of resources for carrying the first indication information, where the network device may determine, based on the second resource for carrying the second indication information, a resource for carrying the first indication information. In this case, the terminal device may not need to use the resource allocated by using the response information of the second indication information to send the first indication information, but directly sends the first indication information on the resource for carrying the first indication information. In other words, in this case, the network device may not need to send, to the terminal device, the response information indicating the resource for carrying the first indication information. Details are described in the following embodiments.

Based on the foregoing technical solutions, the terminal device may send the second indication information on the corresponding second resource based on the situation of the link failure cell, or generate the second indication information, so that the network device can allocate, to the terminal device based on the second resource, the resource that is of the appropriate size and that is for carrying the first indication information. Alternatively, the network device may activate, for the terminal device, the resource for carrying the first indication information. Alternatively, the network device may determine the corresponding first resource, that is, determine the first resource for carrying the first indication information, based on the association between the second resource and the first resource with reference to the second resource for carrying the second indication information.

With reference to the third aspect, in some implementations of the third aspect, the communication method further includes: sending third indication information, where the third indication information indicates the first resource for carrying the first indication information.

Based on the foregoing technical solution, the network device may dynamically allocate, to the terminal device, the first resource that is of an appropriate size and that is for carrying the first indication information.

With reference to the third aspect, in some implementations of the third aspect, the first resource carries the first indication information in a corresponding format.

With reference to the third aspect, in some implementations of the third aspect, that the first indication information is determined based on a situation of the link failure cell includes: a format of the first indication information is determined based on the situation of the link failure cell; and/or a resource for carrying the first indication information is determined based on the situation of the link failure cell.

With reference to the third aspect, in some implementations of the third aspect, the format of the first indication information is the first format or the second format, where the first format and the second format meet one or more of the following: a quantity of bits occupied by the first indication information in the first format is less than a quantity of bits occupied by the first indication information in the second format; the first indication information in the first format indicates information about N1 link failure cells, and the first indication information in the second format indicates information about N2 link failure cells, where N1 and N2 are integers greater than or equal to 1, and N1<N2; or a payload of information included in the first indication information in the first format is less than a payload of information included in the first indication information in the second format.

With reference to the third aspect, in some implementations of the third aspect, the format of the first indication information is the first format, and the first indication information in the first format includes one or more of the following information: a serving cell identifier field, a first field, or a second field, where the serving cell identifier field indicates an identifier of the link failure cell by using a state value, the first field indicates whether the link failure cell indicated by the serving cell identifier field has a corresponding second field, and the second field indicates reference signal information used to recover a link in the link failure cell indicated by the serving cell identifier field.

With reference to the third aspect, in some implementations of the third aspect, the format of the first indication information is the second format, and the first indication information in the second format includes one or more of the following information: a serving cell identifier field, a first field, or a second field, where the serving cell identifier field indicates an identifier of the link failure cell by using a bitmap, the first field indicates whether the link failure cell indicated by the serving cell identifier field has a corresponding second field, and the second field indicates reference signal information used to recover a link in the link failure cell indicated by the serving cell identifier field.

With reference to the third aspect, in some implementations of the third aspect, if the situation of the link failure cell satisfies a preset condition, the first indication information indicates an identifier of the link failure cell by using a state value; and/or if the situation of the link failure cell does not meet the preset condition, the first indication information indicates the identifier of the link failure cell by using a bitmap.

With reference to the third aspect, in some implementations of the third aspect, the preset condition includes: a quantity of link failure cells is less than or equal to a preset first threshold, or a valid payload of the information about the link failure cell is less than or equal to a preset second threshold.

With reference to the third aspect, in some implementations of the third aspect, the situation of the link failure cell includes: a quantity of link failure cells and/or a valid payload of the information about the link failure cell.

According to a fourth aspect, a communications apparatus is provided. The communications apparatus is configured to perform the communication method provided in the first aspect or the second aspect. Specifically, the communications apparatus may include modules configured to perform the communication method provided in the first aspect or the second aspect.

According to a fifth aspect, a communications apparatus is provided. The communications apparatus is configured to perform the communication method provided in the third aspect. Specifically, the communications apparatus may include modules configured to perform the communication method provided in the third aspect.

According to a sixth aspect, a communications apparatus is provided. The communications apparatus includes a processor. The processor is coupled to a memory, and may be configured to execute an instruction in the memory, to implement the communication method in any one of the first aspect or the second aspect, or the possible implementations of the first aspect or the second aspect. Optionally, the communications apparatus further includes the memory. Optionally, the communications apparatus further includes a communications interface, the processor is coupled to the communications interface, and the communications interface is configured to input and/or output information. The information includes at least one of an instruction and data.

In an implementation, the communications apparatus is a terminal device. When the communications apparatus is the terminal device, the communications interface may be a transceiver or an input/output interface.

In another implementation, the communications apparatus is a chip or a chip system. When the communications apparatus is the chip or the chip system, the communications interface may be an input/output interface, or may be an input/output interface, an interface circuit, an output circuit, an input circuit, a pin, a related circuit, or the like on the chip or the chip system. The processor may alternatively be reflected as a processing circuit or a logic circuit.

In another implementation, the communications apparatus is a chip or a chip system configured in the terminal device.

Optionally, the transceiver may be a transceiver circuit. Optionally, the input/output interface may be an input/output circuit.

According to a seventh aspect, a communications apparatus is provided. The communications apparatus includes a processor. The processor is coupled to a memory, and may be configured to execute an instruction in the memory, to implement the communication method in any one of the third aspect or the possible implementations of the third aspect. Optionally, the communications apparatus further includes the memory. Optionally, the communications apparatus further includes a communications interface, the processor is coupled to the communications interface, and the communications interface is configured to input and/or output information. The information includes at least one of an instruction and data.

In an implementation, the communications apparatus is a network device. When the communications apparatus is the network device, the communications interface may be a transceiver or an input/output interface.

In another implementation, the communications apparatus is a chip or a chip system. When the communications apparatus is the chip or the chip system, the communications interface may be an input/output interface, an interface circuit, an output circuit, an input circuit, a pin, a related circuit, or the like on the chip or the chip system. The processor may alternatively be reflected as a processing circuit or a logic circuit.

In another implementation, the communications apparatus is a chip or a chip system configured in the network device.

Optionally, the transceiver may be a transceiver circuit. Optionally, the input/output interface may be an input/output circuit.

According to an eighth aspect, a computer-readable storage medium is provided. The computer-readable storage medium stores a computer program, and when the computer program is executed by a communications apparatus, the communications apparatus is enabled to implement the communication method according to any one of the first aspect or the second aspect, or the possible implementations of the first aspect or the second aspect.

According to a ninth aspect, a computer-readable storage medium is provided. The computer-readable storage medium stores a computer program, and when the computer program is executed by a communications apparatus, the communications apparatus is enabled to implement the communication method according to any one of the third aspect, or the possible implementations of the third aspect.

According to a tenth aspect, a computer program product including an instruction is provided. When the instruction is executed by a computer, a communications apparatus is enabled to implement the communication method provided in the first aspect or the second aspect.

According to an eleventh aspect, a computer program product including an instruction is provided. When the instruction is executed by a computer, a communications apparatus is enabled to implement the communication method provided in the third aspect.

According to a twelfth aspect, a communications system is provided. The communications system includes the foregoing network device and terminal device.

Based on the embodiments of this application, the first indication information sent by the terminal device, that is, the first indication information indicating the information about the link failure cell, may be generated based on the situation of the link failure cell. For example, the format of the first indication information to be sent is determined based on the situation of the link failure cell. In other words, an information format of a variable length is designed to indicate the information about the link failure cell, so that the terminal device can adaptively adjust a size or a format of the first indication information sent by the terminal device, thereby effectively reducing reporting of redundant information, and reducing reporting overheads. For another example, a resource for carrying the first indication information is determined based on the situation of the link failure cell, so that the resource for carrying the first indication information can be properly allocated, thereby reducing a resource waste and improving resource utilization.

BRIEF DESCRIPTION OF DRAWINGS

FIG. 6 to FIG. 14 are schematic diagrams of formats of first indication information applicable to an embodiment of this application;

DESCRIPTION OF EMBODIMENTS

Figure 1:
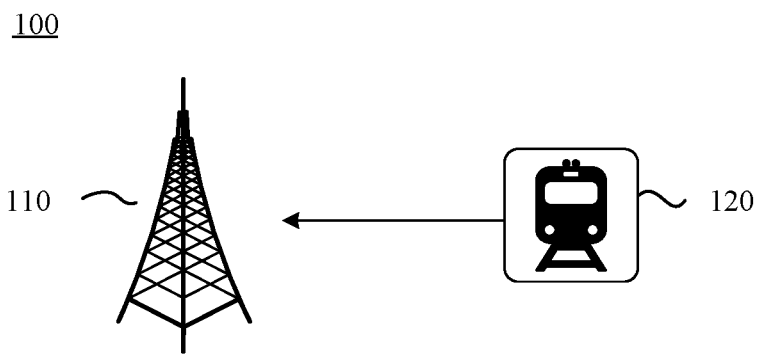
FIG. 1 and FIG. 2 are schematic diagrams of a communications system applicable to an embodiment of this application.

The following describes the technical solutions in this application with reference to the accompanying drawings.

The technical solutions in the embodiments of this application may be applied to various communications systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS) system, a 5th generation (5th generation, 5G) mobile communications system, or a new radio (new radio, NR) system. The 5G mobile communications system may include non-standalone (non-standalone, NSA) and/or standalone (standalone, SA).

The technical solutions provided in this application may be further applied to future communications systems, for example, a sixth generation mobile communications system. The communications system may alternatively be a PLMN network, a device to device (device-to-device, D2D) network, a machine to machine (machine to machine, M2M) network, an internet of things (internet of things, IoT) network, or another network. The IoT network may include, for example, the internet of vehicles. Communication manners in an internet of vehicles system are collectively referred to as V2X (X represents anything). For example, the V2X communication includes vehicle to vehicle (vehicle to vehicle, V2V) communication, vehicle to infrastructure (vehicle to infrastructure, V2I) communication, vehicle to pedestrian (vehicle to pedestrian, V2P) communication, or vehicle to network (vehicle to network, V2N) communication.

A terminal device in the embodiments of this application may also be referred to as user equipment (user equipment, UE), a mobile station (mobile station, MS), a mobile terminal (mobile terminal, MT), an access terminal, a subscriber unit, a user station, a mobile station, a mobile station, a remote station, a remote terminal, a mobile device, a user terminal, a terminal, a wireless communications device, a user agent, a user apparatus, or the like.

The terminal device may be a device that provides a user with voice/data connectivity, for example, a handheld device or a vehicle-mounted device having a wireless connection function. Currently, some examples of the terminal are: a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network, a terminal device in a future evolved public land mobile communications network (public land mobile network, PLMN), or the like. This is not limited in the embodiments of this application.

As an example instead of a limitation, in the embodiments of this application, the terminal device may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in the embodiments of this application may alternatively be a terminal device in an IoT system. The IoT is an important constituent part of future development of information technologies. A main technical feature of the IoT is connecting a thing to a network by using a communications technology, to implement an intelligent network for interconnection between a person and a machine or between one thing and another. In the embodiments of this application, an IoT technology may implement massive connections, deep coverage, and terminal power saving by using, for example, a narrowband (narrow band) NB technology.

In addition, in the embodiments of this application, the terminal device may alternatively include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

In addition, the network device in the embodiments of this application may be a device configured to communicate with the terminal device. The network device may be a base transceiver station (base transceiver station, BTS) in a global system for mobile communications (global system for mobile communications, GSM) system or a code division multiple access (code division multiple access, CDMA) system, may be a NodeB (NodeB, NB) in a wideband code division multiple access (wideband code division multiple access, WCDMA) system, may be an evolved NodeB (evolved NodeB, eNB or eNodeB) in an LTE system, or may be a radio controller in a cloud radio access network (cloud radio access network, CRAN) scenario. Alternatively, the network device may be a relay node, an access point, a vehicle-mounted device, a wearable device, a network device in a future 5G network, a network device in a future evolved PLMN, or the like. This is not limited in the embodiments of this application.

The network device in the embodiments of this application may be a device in a wireless network, for example, a radio access network (radio access network, RAN) node that connects a terminal to the wireless network. Currently, some examples of the RAN node are a base station, a next-generation NodeB gNB, a transmission reception point (transmission reception point, TRP), an evolved NodeB (evolved Node B, eNB), a home base station, a baseband unit (baseband unit, BBU), an access point (access point, AP) in a Wi-Fi system, or the like.

In a network structure, the network device may include a centralized unit (centralized unit, CU) node, a distributed unit (distributed unit, DU) node, a RAN device including a CU node and a DU node, or a RAN device including a control plane CU node (CU-CP node), a user plane CU node (CU-UP node), and a DU node.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of methods provided in the embodiments of this application is not specifically limited in the embodiments of this application provided that a program that records code for the methods provided in the embodiments of this application can be run to perform communication according to the methods provided in the embodiments of this application. For example, the execution body of the methods provided in the embodiments of this application may be the terminal device, the network device, or a functional module that is in the terminal device or the network device and that can invoke and execute a program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (compact disc, CD), or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

For ease of understanding the embodiments of this application, a communications system applicable to the embodiments of this application is described in detail with reference to FIG. 1 and FIG. 2.

FIG. 1 is a schematic diagram of a communications system 100 applicable to an embodiment of this application. The communications system 100 may be in a single-carrier scenario or a carrier aggregation (carrier aggregation, CA) scenario. Carrier aggregation may refer to aggregation of a plurality of contiguous or non-contiguous component carriers into a larger bandwidth.

As shown in the figure, the communications system 100 may include at least one network device such as a network device 110 shown in FIG. 1. The communications system 100 may further include at least one terminal device such as a terminal device 120 shown in FIG. 1. The network device 110 and the terminal device 120 may communicate with each other through a wireless link.

After the terminal device 120 detects that a link between the network device 110 and the terminal device 120 is faulty, the terminal device 120 may send a link failure recovery request (beam failure recovery request, BFRQ) to the network device 110. Optionally, after receiving the BFRQ, the network device 110 may send a link failure recovery response (beam failure recovery response, BFRR) to the terminal device 120 or reconfigure a link.

Optionally, the network device 110 may include one or more cells, for example, a first cell and a second cell. If a link that is between the terminal device 120 and the network device 110 and that is in the second cell is faulty, the first cell may assist the second cell in recovering the link. For example, the terminal device 120 may send the BFRQ information to the network device 110 on an uplink resource that belongs to the first cell, and the terminal device 120 may receive, on a downlink resource that belongs to the second cell, the BFRR information sent by the network device 110.

When a transmission direction of the communications system 100 is uplink transmission, the terminal device 120 is a transmit end, and the network device 110 is a receive end. When a transmission direction of the communications system 100 is downlink transmission, the network device 110 is a transmit end, and the terminal device 120 is a receive end.

Figure 2:
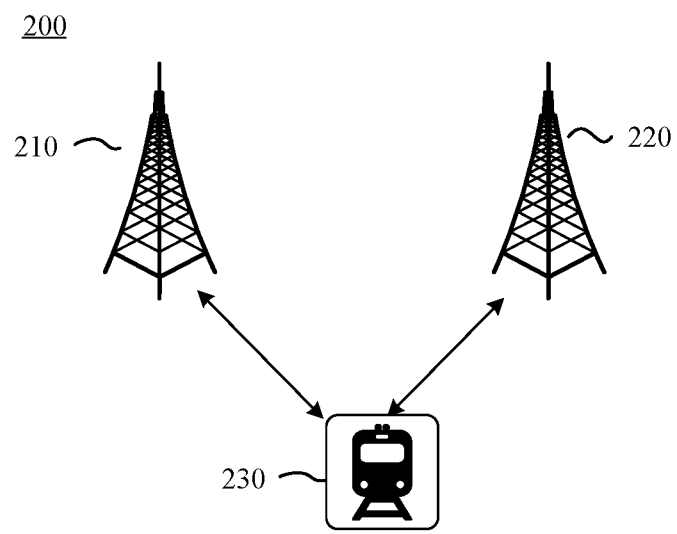

FIG. 2 is another schematic diagram of a communications system 200 applicable to an embodiment of this application. The communications system 200 may be in scenarios of dual connectivity (dual connectivity, DC), multi-connectivity, or coordinated multipoint transmission/reception (coordinated multipoint transmission/reception, CoMP).

As shown in the figure, the communications system 200 may include a plurality of network devices such as a network device 210 and a network device 220 shown in FIG. 2. The communications system 200 may further include at least one terminal device such as a terminal device 230 shown in FIG. 2. The terminal device 230 may establish a radio link to the network device 210 and the network device 220 by using a multi-connectivity technology. The network device 210 may be, for example, a master base station, and the network device 220 may be, for example, a secondary base station. In this case, the network device 210 is a network device used when the terminal device 230 performs initial access, and is responsible for radio resource control (radio resource control, RRC) communication with the terminal device 230. The network device 220 may be added during RRC reconfiguration, and is configured to provide an additional radio resource. The terminal device 230 for which carrier aggregation is configured is connected to the network device 210 and the network device 220. A link between the network device 210 and the terminal device 230 may be referred to as a first link, and a link between the network device 220 and the terminal device 230 may be referred to as a second link.

In addition, as shown in FIG. 2, one of the two network devices, for example, the network device 210, may be responsible for exchanging a radio resource control message with the terminal device and responsible for interaction with a core network control plane entity. In this case, the network device 210 may be referred to as a master node (master node, MN). For example, the master node may be a master eNB (master eNB, MeNB) or a master gNB (master gNB, MgNB), and is not limited thereto. In this case, the other network device, for example, the network device 220, may be referred to as a secondary node (secondary node, SN). For example, the secondary node may be a secondary eNB (secondary eNB, SeNB) or a secondary gNB (secondary gNB, SgNB). This is not limited herein. A plurality of serving cells in the master node may form a master cell group (master cell group, MCG), including one primary cell (primary cell, PCell) and one or more optional secondary cells (secondary cell, SCell). A plurality of secondary cells in the secondary node may form a secondary cell group (secondary cell group, SCG), including one primary secondary cell (primary secondary cell, PSCell) and one or more optional SCells. The serving cell is a cell that is configured by a network for the terminal device to perform uplink and downlink transmission.

For ease of understanding, the terms mentioned above are briefly described.

Primary cell: The primary cell may also be referred to as a primary serving cell (primary serving cell, PCell). A PCell is a cell on which the terminal device camps in carrier aggregation. Generally, only a PCell has a physical uplink control channel (physical uplink control channel, PUCCH).

A primary secondary cell may also be referred to as a secondary primary cell. The PSCell is a special secondary cell that is on a secondary eNodeB (secondary eNodeB, SeNB) and that is configured by a master eNodeB (master eNodeB, MeNB) for the terminal device in dual connectivity by using RRC connection signaling.

SCell: The SCell is a cell that is configured for the terminal device in carrier aggregation by using RRC connection signaling and that works on a secondary component carrier (SCC), and may provide more radio resources for the terminal device in carrier aggregation. In the SCell, there may be downlink transmission or both uplink and downlink transmission.

Special cell (Special Cell, SpCell): In the dual connectivity scenario, the SpCell refers to a PCell in a master cell group (master cell group, MCG) or a PSCell in a secondary cell group (secondary cell group, SCG). In other scenarios such as the carrier aggregation scenario, the SpCell refers to the PCell.

MCG: The master cell group is a group in which a cell that provides a service for the terminal device and that is served by a master base station is located. In a dual connectivity mode, the MCG includes a group of serving cells associated with the MeNB, where the group of serving cells include a PCell and one or more SCells.

SCG: The secondary cell group is a group in which a cell that provides a service for the terminal device and that is served by the secondary base station is located. In the dual connectivity mode, the SCG includes a PSCell and one or more optional SCells.

MeNB: The MeNB is a base station that serves a cell on which the terminal device in dual connectivity camps.

SeNB: The SeNB is another one or more base stations that are configured by the MeNB for the terminal device in dual connectivity by using RRC connection signaling.

Similarly, the terminal device may also have communication connections to more network devices at the same time and may receive and send data. In the plurality of network devices, one network device may be responsible for exchanging a radio resource control message with the terminal device, and is responsible for interaction with a core network control plane entity. In this case, the network device may be referred to as an MN, and the remaining network devices may be referred to as SNs.

Certainly, alternatively, the network device 220 may be a master base station or a master node, and the network device 210 may be a secondary base station or a secondary node.

This is not limited in this application. In addition, for ease of understanding only, the figure shows a case in which the two network devices are connected to the terminal device in a wireless manner. However, this should not constitute any limitation on a scenario to which this application is applicable. The terminal device may further establish radio links with more network devices, or the terminal device may further establish radio links with fewer network devices.

When both the network device 210 and the network device 220 may configure, for the terminal device 230, an uplink resource used to transmit a BFRQ, when the first link or the second link is faulty, the terminal device 230 may send the BFRQ to the network device 210 or the network device 220 on the uplink resource used to transmit the BFRQ. After receiving the BFRQ, the network device 210 or the network device 220 sends a BFRR to the terminal device 230.

Particularly, if the network device 220 does not configure an uplink resource used to transmit a BFRQ, when the second link is faulty, the terminal device 230 may recover the second link by using the network device 210.

A plurality of antennas may be configured for each communications device such as the network device 110 or the terminal device 120 in FIG. 1, or the network device 210, the network device 220, or the terminal device 230 in FIG. 2. The plurality of antennas may include at least one transmit antenna used to send a signal and at least one receive antenna used to receive a signal. In addition, the communications devices each may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multiple-antenna technology.

The communications system applicable to this application is merely an example for description, and the communications system applicable to this application is not limited thereto. For example, quantities of network devices and terminal devices included in the communications system may alternatively be other quantities, or a single base station scenario, a multi-carrier aggregation scenario, a dual connectivity scenario, or a device to device (device to device, D2D) communication scenario is used.

It should be understood that the technical solutions in the embodiments of this application may be applied to a carrier aggregation scenario in which one cell assists another cell or a plurality of cells in recovering a link. Alternatively, the technical solutions in the embodiments of this application may be applied to a dual connectivity scenario in which one cell in a cell group assists another cell or a plurality of cells in recovering a link. Alternatively, the technical solutions in the embodiments of this application may be further applied to a single-carrier scenario, a carrier aggregation scenario, or a dual connectivity scenario in which a cell recovers a failed link in the cell on a resource of the cell.

It should be further understood that the technical solutions in the embodiments of this application are applicable to a case in which a primary cell (PCell) is a high frequency cell or a low frequency cell, and a secondary cell (SCell) is a high frequency cell or a low frequency cell. For example, the PCell is a low frequency cell and the SCell is a high frequency cell. In a possible implementation, for a SCell for which no uplink resource is configured, an uplink resource of the PCell may be used to assist the SCell in recovering a link. Usually, a low frequency and a high frequency are relative to each other, or may be delimited by a specific frequency, for example, 6 GHz.

It should be further understood that the technical solutions in the embodiments of this application may be further applied to a coordinated multipoint transmission/reception (coordinated multipoint transmission/reception, CoMP) scenario in which one TRP assists another TRP in recovering a link. The CoMP may be one or more of the following scenarios: non-coherent joint transmission (non coherent joint transmission, NCJT), coherent joint transmission (coherent joint transmission, CJT), or joint transmission (joint transmission, JT).

For ease of understanding the embodiments of this application, several terms used in this application are briefly described.

1. Control Resource Set (Control Resource Set, CORESET)

The control resource set is a resource set used to transmit downlink control information, and may also be referred to as a control resource region or a physical downlink control channel resource set.

The network device may configure one or more control resource sets for the terminal device, to send a physical downlink control channel (physical downlink control channel, PDCCH). The network device may send the control channel to the terminal device on any control resource set corresponding to the terminal device. In addition, the network device further needs to notify the terminal device of other configurations associated with the control resource set, for example, a search space set. Configuration information of each control resource set is different, for example, different in a frequency domain width and a time domain length.

Optionally, the control resource set in this application may be any one of the following: a CORESET defined in a 5G mobile communications system, a control region (control region), or an enhanced physical downlink control channel (enhanced-physical downlink control channel, ePDCCH) set (set).

A time-frequency location occupied by the PDCCH may be referred to as a downlink control region. In a possible case, the PDCCH is always located in first m symbols of a subframe. A possible value of m is 1, 2, 3, or 4. Locations of the E-PDCCH and an R-PDCCH are not in the first m symbols.

The downlink control region may be flexibly configured by using RRC signaling by using a control resource set (control resource set, CORESET) and a search space set (search space set). Information such as a frequency domain position of a PDCCH or a control channel element (control channel element, CCE) and a quantity of contiguous symbols in time domain may be configured in the control resource set. Information such as a PDCCH detection periodicity and offset, and a start symbol in a slot may be configured in the search space set.

For example, if it may be configured in the search space set that a PDCCH periodicity is one slot and a start symbol in time domain is a symbol 0, the terminal device may detect a PDCCH at a start location of each slot.

2. Spatial Correlation Parameter Information

The spatial correlation parameter information may include quasi-collocation (quasi-collocation, QCL) information, and may further include spatial relation (spatial relation) information. Generally, the QCL information is used to indicate a spatial correlation parameter (which may also be referred to as a spatial correlation characteristic) of a downlink signal, and the spatial relation information is used to indicate a spatial correlation parameter (which may also be referred to as a spatial correlation characteristic) of an uplink signal.

The uplink signal includes but is not limited to: a PUCCH, a physical uplink shared channel (physical uplink shared channel, PUSCH), a sounding reference signal (sounding reference signal, SRS), and a demodulation reference signal (demodulation reference signal, DMRS).

The downlink signal includes but is not limited to: a PDCCH, a physical downlink shared channel (physical downlink shared channel, PDSCH), a tracking reference signal (tracking reference signal, TRS), a channel state information reference signal (channel state information reference signal, CSI-RS), a cell specific reference signal (cell specific reference signal, CS-RS), a UE specific reference signal (user equipment specific reference signal, US-RS), a demodulation reference signal (demodulation reference signal, DMRS), and a synchronization signal broadcast channel block (synchronization signal/physical broadcast channel block, SS/PBCH block). The SS/PBCH block may be briefly referred to as a synchronization signal block (synchronization signal block, SSB). The SSB includes one or more of the following: a primary synchronization signal (primary synchronization signal, PSS), a secondary synchronization signal (secondary synchronization signal, SSS), and a PBCH. The SSB is a signal mainly used for cell searching, cell synchronization, and carrying broadcast information.

The spatial relation information is used to assist in describing transmit side beamforming information and a transmit procedure of the terminal device.

The spatial relation information is used to indicate a spatial sending parameter relationship between two reference signals. A target reference signal is usually a downlink signal, for example, may be a DMRS or an SRS. A referenced reference signal or a source reference signal may be generally a CSI-RS, an SRS, an SSB, or the like.

Quasi-co-location may also be referred to as quasi-co-site or co-location. The QCL information may also be referred to as QCL assumption information. The QCL information is used to assist in describing receive side beamforming information and a receiving procedure of the terminal device.

The QCL information may be used to indicate a QCL relationship between two reference signals. The target reference signal is usually a downlink signal, for example, may be a DMRS or a CSI-RS. The referenced reference signal or the source reference signal may be generally a CSI-RS, an SSB, a TRS, or the like. The TRS is also a type of CSI-RS. The QCL information of the PDCCH is used as an example, and a method for configuring the QCL information of the PDCCH may be as follows:

K pieces of candidate QCL information of the PDCCH are configured. For example, the K pieces of candidate QCL information of the PDCCH are configured by using RRC, and the K pieces of candidate QCL information may include, for example, K TCI-states. K is an integer greater than or equal to 1.

The QCL information of the PDCCH (example) is indicated. For example, the QCL information of the PDCCH is indicated by using a media access control (Media Access Control, MAC) control element (control element, CE) (MAC CE) (when K is an integer greater than 1).

It may be specified that in an initial radio resource control (radio resource control, RRC) phase and a media access control (media access control, MAC)-control element (control element, CE) phase, the terminal device assumes that DMRSs of a PDCCH and a PDSCH and an SSB determined during initial access are QCLed.

Signals corresponding to antenna ports having a QCL relationship may have a same or similar spatial characteristic parameter (or referred to as a parameter), or a spatial characteristic parameter (or referred to as a parameter) of one antenna port may be used to determine a spatial characteristic parameter (or referred to as a parameter) of another antenna port that has a QCL relationship with the antenna port, or two antenna ports have a same or similar spatial characteristic parameter (or referred to as a parameter), or a difference between spatial characteristic parameters (or referred to as parameters) of two antenna ports is less than a threshold.

It should be understood that spatial characteristic parameters of two reference signals or channels that satisfy a QCL relationship are the same (close or similar), so that a spatial characteristic parameter of the target reference signal can be inferred based on a resource index of the source reference signal.

It should be further understood that spatial characteristic parameters of two reference signals or channels that satisfy spatial relation information are the same (close or similar), so that a spatial characteristic parameter of the target reference signal can be inferred based on a resource index of the source reference signal.

The spatial characteristic parameter may include one or more of the following parameters: an angle of arrival (angle of arrival, AoA), a dominant (dominant) angle of arrival AoA, an average angle of arrival, a power angular spectrum (power angular spectrum, PAS) of the angle of arrival, an angle of departure (angle of departure, AoD), a dominant angle of departure, an average angle of departure, a power angular spectrum of the angle of departure, a transmit beam of the terminal device, a receive beam of the terminal device, spatial channel correlation, a transmit beam of the network device, a receive beam of the network device, an average channel gain, an average channel delay (average delay), a delay spread (delay spread), a doppler spread (Doppler spread), a doppler shift (doppler shift), a spatial reception parameter (spatial Rx parameters), or the like.

The foregoing angles may be decomposition values at different dimensions or a combination of decomposition values at different dimensions. The antenna ports may be antenna ports having different antenna port numbers. Alternatively, the antenna ports may be antenna ports that have a same antenna port number or different antenna port numbers and that send or receive information at different time. Alternatively, the antenna port may be antenna ports that have a same antenna port number or different antenna port numbers and that send or receive information at different frequencies. Alternatively, the antenna ports may be antenna ports that have a same antenna port number or different antenna port numbers and that send or receive information in different code domain resources.

These spatial characteristic parameters describe a characteristic of a spatial channel between an antenna port for the source reference signal and an antenna port for the target reference signal, so that the terminal device completes a receive side beamforming process or a receiving processing process based on the QCL information. For example, the terminal device may receive the target reference signal based on receive beam information that is of the source reference signal and that is indicated by the QCL information. These spatial characteristic parameters further help the terminal device to complete a transmit side beamforming or a transmit processing process based on the spatial correlation information. For example, the terminal device may transmit the target reference signal based on the transmit beam information that is of the source reference signal and that is indicated by the spatial correlation information.

To reduce QCL information indication overheads of the network device for the terminal device, in an optional implementation, the network device may indicate that a demodulation reference signal of a PDSCH or a PDCCH has a QCL relationship with one or more of a plurality of reference signal resources previously reported by the terminal device. For example, the reference signal may be a CSI-RS. Each reported CSI-RS resource index corresponds to a transmit-receive beam pair that is previously established during measurement based on a CSI-RS resource. It should be understood that information about receive beams of two reference signals or channels that meet the QCL relationship is the same, and the terminal device may infer, based on indexes of the reference signal resources, the information about the receive beams for receiving the PDCCH or the PDSCH.

In the existing protocol, the QCL relationship may be classified into the following four types based on different parameters:
Type A (type A): Doppler shift (Doppler shift), Doppler spread (Doppler spread), average delay (average delay), and delay spread (delay spread);
Type B (type B): Doppler shift and Doppler spread;
Type C (type C): Doppler shift and average delay; and
Type D (type D): spatial reception parameter (Spatial Rx parameter).

The network device may configure one or more types of QCL at a time for the terminal device, for example, QCL types A+D and QCL types C+D.

When the QCL relationship is a QCL relationship of Type D, the QCL relationship may be considered as spatial QCL. When antenna ports meet the spatial QCL relationship, the QCL relationship may be a QCL relationship (which is referred to as the spatial relation above) between a port for a downlink signal and a port for a downlink signal, or a QCL relationship between a port for an uplink signal and a port for an uplink signal. For example, a QCL relationship between a downlink signal and an uplink signal, or between a port for an uplink signal and a port for a downlink signal may be that the two signals may have a same AOA or AOD, to indicate that the two signals have a same receive beam or transmit beam. For another example, a QCL relationship between downlink signals or between uplink signals, or between ports for uplink signals or ports for downlink signals may be that there is a correspondence between AOAs and AODs of the two signals, or there is a correspondence between AODs and AOAs of the two signals. To be specific, beam reciprocity may be used to determine an uplink transmit beam based on a downlink receive beam, or determine a downlink receive beam based on an uplink transmit beam.

From a perspective of the transmit end, if two antenna ports are spatial QCLed, it may mean that corresponding beam directions of the two antenna ports are consistent in space. From a perspective of the receive end, if two antenna ports are spatial QCLed, it may mean that the receive end can receive, in a same beam direction, signals sent through the two antenna ports.

Signals transmitted on ports having a spatial QCL relationship may further have corresponding beams. The corresponding beam may include at least one or more of the following: a same receive beam, a same transmit beam, a transmit beam corresponding to a receive beam (for example, which may correspond to a reciprocity scenario), and a receive beam corresponding to a transmit beam (for example, which may correspond to a reciprocity scenario).

Signals transmitted on ports having a spatial QCL relationship may alternatively be understood as signals received or sent by using a same spatial filter (spatial filter). The spatial filter may be one or more of the following: precoding, a weight of an antenna port, phase deflection of an antenna port, or an amplitude gain of an antenna port.

Signals transmitted through ports having a spatial QCL relationship may alternatively be understood as having corresponding beam pair links (beam pair link, BPL). The corresponding BPL includes at least one or more of the following: a same downlink BPL, a same uplink BPL, an uplink BPL corresponding to a downlink BPL, or a downlink BPL corresponding to an uplink BPL.

Therefore, the spatial reception parameter (namely, the QCL of Type D) may be understood as a parameter used to indicate direction information of a receive beam.

In an example of this application, correspondences of some parameters may also be used to describe a QCL relationship scenario.

It should be understood that this application is applicable to a QCL assumption scenario in which two reference signals, or transmission objects may have an association relationship.

3. Transmission Configuration Indicator (Transmission Configuration Indicator, TCI) State (TCI-State)

The TCI-state may be used to indicate QCL information of a signal or a channel. The channel may be, for example, a PDCCH, a CORESET, or a PDSCH. The signal may be, for example, a CSI-RS, a DMRS, or a TRS. The TCI information may mean that a reference signal included in the TCI and the channel meet a QCL relationship, and is mainly used to indicate that when the channel is received, information such as a spatial characteristic parameter of the channel is the same as, similar to, or close to information such as a spatial characteristic parameter of the reference signal included in the TCI. The TCI information may also mean that a reference signal included in the TCI and the signal meet a QCL relationship, and is mainly used to indicate that when the signal is received, information such as a spatial characteristic parameter of the signal is the same as, similar to, or close to information such as a spatial characteristic parameter of the reference signal included in the TCI.

One or more referenced reference signals and an associated QCL type (QCL type) may be configured for one TCI-state. In other words, configuration information of one TCI-state may include identifiers of one or two reference signal resources and an associated QCL type. There are four types of QCL: Type A, Type B, Type C, and Type D, which are different combinations or selections of {Doppler shift, Doppler spread, average delay, delay spread, and spatial Rx parameter}. The TCI-state includes the QCL information, or the TCI-state is used to indicate the QCL information.

The TCI-state is configured by the network device for each terminal device. The following is a format of the TCI-state.

```
TCI-State ::=      SEQUENCE {
   tci-StateId         TCI-StateId,
   qcl-Type1           QCI-Info,
   qcl-Type2           QCI-Info
   OPTIONAL,           --Need R
   ...
}
```

-continued

```
QCI-Info ::=        SEQUENCE {
  cell                ServCellIndex
OPTIONAL,           --Need R
bwp-Id              BWP-Id
OPTIONAL,           --Need R
referenceSignal     CHOICE{
csi-rs              NZP-CSI-RS-ResourceSetId
ssb                 SSB-Index
}
qcl-Type            ENUMERATED{TypeA,TypeB,TypeC,TypeD},
...
}
```

In addition, the TCI-state can be globally configured. In TCI-states configured for different cells and different bandwidth parts (bandwidth part, BWP), if indexes of the TCI-states are the same, corresponding TCI-state configurations are also the same.

4. Component Carrier (Component Carrier, CC)

The component carrier may also be referred to as a component carrier, a component carrier, a component carrier, or the like. Each carrier in the multi-carrier aggregation may be referred to as a "CC". The terminal device may receive data on a plurality of CCs. Each carrier includes one or more physical resource blocks (physical resource block, PRB), and each carrier may have a corresponding PDCCH and a PDSCH that is used to schedule a CC. Alternatively, some carriers do not have a PDCCH, and in this case, cross-carrier scheduling (cross-carrier scheduling) may be performed on the carriers.

Cross-carrier scheduling: The network device sends a PDCCH on one CC to schedule data transmission on another CC, that is, the network device transmits a PDSCH on another CC, or transmits a PUSCH on another CC. More specifically, the network device may send a PDCCH in a bandwidth path (BWP) on a CC, to schedule transmission of a PDSCH or a PUSCH in a BWP on another CC. That is, a control channel is transmitted on a CC, and a corresponding data channel is transmitted on another CC.

5. Beam

The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a mixed digital/analog beamforming technology. Different beams may be considered as different resources. Same information or different information may be sent on different beams.

Optionally, a plurality of beams having a same or similar communication feature may be considered as one beam. One beam corresponds to one or more antenna ports, and is used to transmit a data channel, a control channel, a sounding signal, and the like. One or more antenna ports corresponding to one beam may also be considered as one antenna port set.

A beam used to send a signal may be referred to as a transmit beam (transmission beam, Tx beam), or may be referred to as a spatial domain transmit filter (spatial domain transmission filter) or a spatial transmit parameter (spatial transmission parameter). A beam used to receive a signal may be referred to as a receive beam (reception beam, Rx beam), or may be referred to as a spatial domain receive filter (spatial domain receive filter) or a spatial reception parameter (spatial RX parameter).

The transmit beam may refer to distribution of signal strength formed in different directions in space after a signal is transmitted through an antenna, and the receive beam may refer to distribution of signal strength that is of a radio signal received from an antenna and that is in different directions in space.

Beams may be classified into a transmit beam and a receive beam of the network device, and a transmit beam and a receive beam of the terminal device. The transmit beam of the network device is used to describe transmit side beamforming information of the network device, and the receive beam of the network device is used to describe receive side beamforming information of the network device. The transmit beam of the terminal device is used to describe transmit side beamforming information of the terminal device, and the receive beam of the terminal device is used to describe receive side beamforming information of the terminal device. To be specific, a beam may be used to describe beamforming information.

A beam generally corresponds to a resource, and a beam may correspond to a time resource, a space resource, and a frequency domain resource.

Optionally, the beam may further correspond to a reference signal resource (for example, a reference signal resource for beamforming) or beamforming information.

Optionally, the beam may further correspond to information associated with a reference signal resource of the network device. The reference signal may be, for example, a CSI-RS, an SSB, a DMRS, a phase tracking signal (phase tracking reference signal, PTRS), or a TRS. The information associated with the reference signal resource may be an identifier of the reference signal resource, QCL information (for example, QCL Type D), or the like. The identifier of the reference signal resource corresponds to a transmit-receive beam pair that is previously established during measurement based on the reference signal resource. The terminal device may infer beam information based on the index of the reference signal resource.

Optionally, the beam may further correspond to a spatial domain filter (spatial filter or spatial domain filter), or a spatial domain transmission filter (spatial domain transmission filter).

The receive beam may be equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. The information about the spatial correlation parameter may be equivalent to a spatial filter (spatial domain transmission/receive filter). Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. A receive beam on a terminal device side and a transmit beam on a network device side each may be a downlink spatial filter, and a transmit beam on the terminal device side and a receive beam on the network device side each may be an uplink spatial filter.

6. Antenna Port (Antenna Port)

The antenna port may also be referred to as a port for short. The antenna port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

7. Bandwidth Part (Bandwidth Part, BWP)

In NR, different terminal devices in a same cell may have different transmitting or receiving capabilities. Therefore, a system may configure a corresponding bandwidth for each terminal device. The bandwidth configured for the terminal device is referred to as a BWP, and the terminal device performs transmission on the BWP of the terminal device. The BWP may be a group of contiguous frequency domain resources, for example, physical resource blocks (physical resource block, PRB) on a carrier. Frequency domain resources that may be occupied by different BWPs may partially overlap (overlap), or may not overlap each other. The different BWPs may occupy frequency domain resources in a same bandwidth or different bandwidths. This is not limited in this application. A minimum granularity of the BWP in frequency domain may be one PRB.

In a single-carrier scenario, one terminal device may have only one active BWP at a moment, and the terminal device receives data/reference signals or send data/reference signals only in the active BWP (active BWP).

In this application, when this application is applicable to a BWP scenario, a specific BWP may alternatively be a bandwidth set at a specific frequency, a set including a plurality of resource blocks (resource block, RB), or the like. This is not limited.

8. Reference Signal Configured for a Link Detection Failure and a Link Recovery Failure Two different types of reference signals are generally used in a communications system, where one type of reference signal is used to estimate a channel, so as to perform coherent demodulation on a receiving signal including control information or data, and the other type of reference signal is used for measurement of a channel state or channel quality, so as to implement scheduling on the terminal device. The terminal device obtains channel state information (CSI) based on channel quality measurement of the CSI-RS. The CSI includes one or more of the following: a rank indicator (rank indicator, RI), a precoding indicator (precoding matrix indicator, PMI), or a channel quality indicator (channel quality indicator, CQI). The information may be sent by the terminal device to the network device by using a physical uplink control channel or a physical uplink shared channel.

To detect a beam failure, the network device may indicate, to the terminal device, a beam failure detection reference signal (beam failure detection RS) resource (which may also be referred to as a link failure detection reference signal resource).

For example, the network device may indicate, by using one or more types of the following signaling: RRC signaling, a media access control control element (media access control control element, MAC-CE) signaling, or DCI signaling, a configured link failure detection reference signal resource set. For another example, a reference signal for beam failure detection may be alternatively indicated in an implicit manner. For example, a reference signal associated with a TCI indicating a PDCCH is used as a reference signal for beam failure detection. The reference signal is a reference signal that meets a QCL relationship with a DMRS of the PDCCH and that is periodically sent.

Optionally, when the network device explicitly configures a beam failure detection reference signal resource set, the terminal device may detect a beam failure based on the beam failure detection reference signal resource set. When the network device does not explicitly configure a beam failure detection reference signal resource set, the terminal device may detect a beam failure based on the reference signal indicated in the foregoing implicit manner.

To recover a beam failure, the network device may further indicate, to the terminal device, a candidate reference signal resource set (a candidate beam RS list, a candidate beam RS identification resource, a beam failure candidate beam resource, a candidate beam identification RS, or a candidate beam list) (which may also be referred to as a candidate reference signal resource set or a link failure recovery reference signal resource set) used to recover a link between the terminal device and the network device.

After a beam fails, the terminal device may select, from the candidate reference signal resource set, a reference signal resource whose channel quality information (for example, reference signal received power (reference signal receiving power, RSRP), a channel quality indicator (channel quality indicator, CQI), a block error rate (block error ratio, BLER), a signal to interference plus noise ratio (signal to Interference plus noise ratio, SINR), or a signal noise ratio (signal noise ratio, SNR)) is higher than a predetermined threshold, where the reference signal resource is used to recover a communications link. Alternatively, the candidate beam identification RS may be understood as a reference signal set used by the terminal device to initiate link reconfiguration after the terminal device determines that a beam failure occurs on a transmit beam of the network device.

It should be understood that in a specific implementation, the two sets, namely, the beam failure detection reference signal resource set and the reference signal resource set used to recover a link between the terminal device and the network device may alternatively have other names. This is not specifically limited in this application.

The foregoing is merely an example for description. A beam failure detection reference signal resource, a candidate reference signal resource set used to recover a link between the terminal device and the network device, a detection method, and a recovery method are not limited in the embodiments of this application.

In the embodiments of this application, a beam failure may also be referred to as a communication failure, a beam fault, a link failure, a link fault, a communication failure, a communication fault, a communications link failure, a communications link fault, or the like. In the embodiments of this application, these concepts have a same meaning.

In the embodiments of this application, beam failure recovery may also be referred to as recovering communication between the network device and the terminal device, communication failure recovery, beam fault recovery, beam recovery, link failure recovery, link fault recovery, link recovery, communication failure recovery, communication fault recovery, communications link failure recovery, communications link fault recovery, communication recovery, link reconfiguration, and the like.

In the embodiments of this application, beam failure recovery request information (beam failure recovery request, BFRQ) may also be referred to as communication failure recovery request information, beam fault recovery request information, beam recovery request information, link failure recovery request information, link fault recovery request information, link recovery request information, communication fault recovery request information, communication recovery request information, communications link failure recovery request information, communications link fault recovery request information, communications link recovery request information, link reconfiguration request information, reconfiguration request information, and the like. Optionally, the beam failure recovery request may mean sending a signal on a resource for carrying the communication failure recovery request.

It should be understood that "information" in the embodiments of this application may be replaced with "message". In the embodiments of this application, these concepts have a same meaning.

In the embodiments of this application, beam failure recovery response information (beam failure recovery response, BFRR) may also be referred to as communication failure recovery response information, beam fault recovery response information, beam failure response information, beam fault response information, beam recovery response information, link failure recovery response information, link fault recovery response information, link failure response information, link fault response information, link recovery response information, communication fault recovery response information, communication failure response information, communication fault response information, communication recovery response information, communications link failure recovery response information, communications link fault recovery response information, communications link fault response information, communications link failure response information, communications link response information, link reconfiguration response information, reconfiguration response information, and the like. It should be understood that in the embodiments of this application, the beam failure recovery response information may be referred to as response information for short.

In the embodiments of this application, beam failure recovery response information may be downlink control information (downlink control information, DCI) that is scrambled by using a cell radio network temporary identifier (cell radio network temporary identifier, C-RNTI) and that is used to receive cyclic redundancy check (cyclic redundancy check, CRC) on a control resource set and/or a search space set used to send a communication failure recovery response. Alternatively, the beam failure recovery response information may be DCI scrambled by using other information (for example, DCI scrambled by using a BFR-RNTI), or data scheduled by the DCI, or an ACK of data scheduled by the DCI. The beam failure recovery response information may further be one of the following information: DCI scrambled by using a C-RNTI, DCI scrambled by using a modulation and coding scheme (Modulation and Coding Scheme, MCS) cell-specific radio network temporary identifier MCS-C-RNTI, downlink control information DCI in a dedicated search space, DCI scrambled by using a dedicated radio network temporary identifier RNTI, DCI scrambled by using a random access radio network temporary identifier RA-RNTI, DCI including a preset state value, DCI including transmission configuration indicator TCI information, quasi co-location QCL indication information of a cell in which a link failure occurs, or DCI in a preset format, where the DCI in the preset format indicates newly transmitted data. This is not limited in the embodiments of this application.

It should be understood that in the embodiments of this application, the beam failure, the beam failure recovery, the beam failure recovery request information, and the beam failure recovery response information may alternatively have other names. This is not specifically limited in this application.

It should be understood that, in this embodiment of this application, a link recovery failure may be understood as that the terminal device no longer sends link failure recovery request information, or may be understood as stopping timing of a link failure recovery clock, or may be understood as stopping counting of a link failure recovery counter, or the like.

9. Beam Training Process

A beam training process may include the following process.

Figure 3:
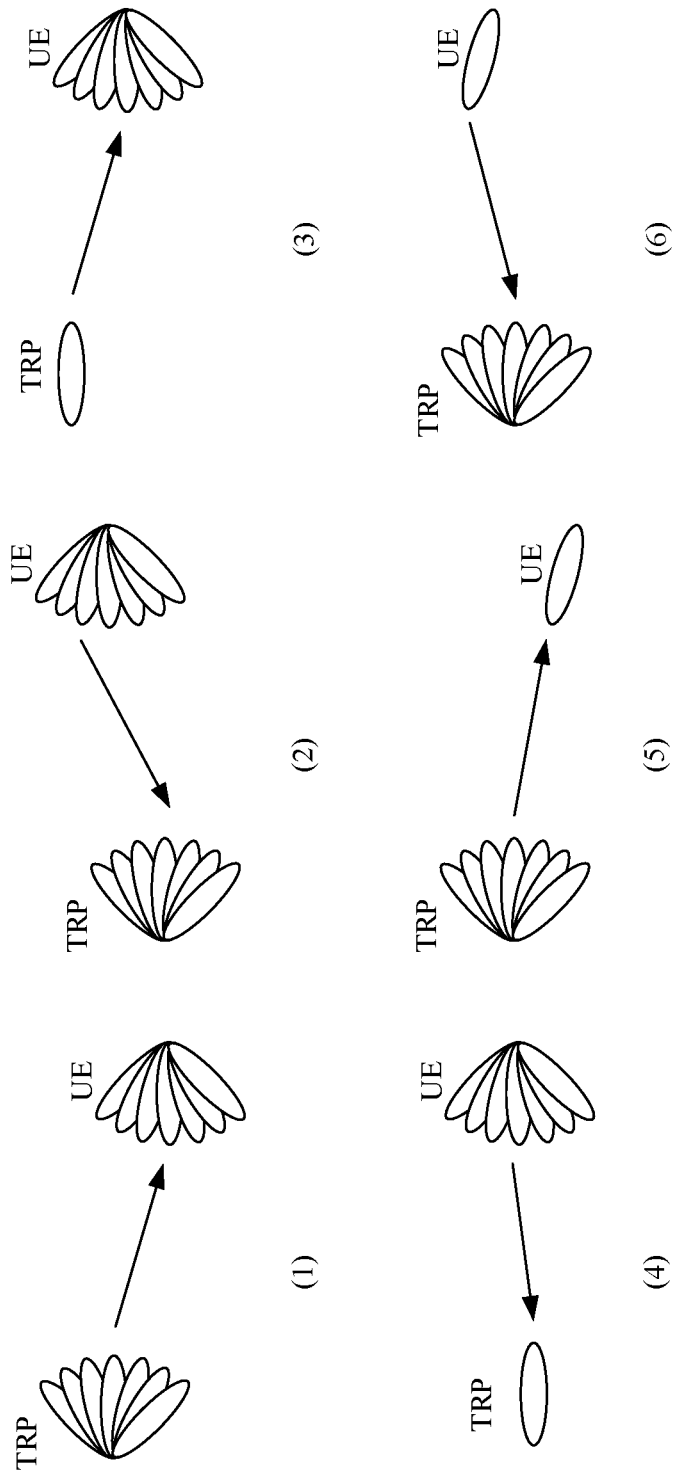
FIG. 3 is a schematic diagram of a beam training process.

N optimal beam pairs (beam pair link, BPL) are selected, where N is an integer greater than 1 or equal to 1. One BPL may include one transmit beam of the network device and one receive beam of the terminal device, or one BPL may include one transmit beam of the terminal device and one receive beam of the network device. The terminal device selects the transmit beam of the network device and/or the receive beam of the terminal device based on beam sweeping performed by the network device, and the network device selects the transmit beam of the terminal device and/or the receive beam of the network device based on beam sweeping performed by the terminal device. Downlink joint TRP and terminal device beam refinement (DL TRP and UE beam refinement) is shown in (1) in FIG. 3, or uplink joint TRP and terminal device beam refinement (UL TRP and UE beam refinement) is shown in (2) in FIG. 3.

The transmit beam is updated. The transmit beam may be the transmit beam of the network device, or may be the transmit beam of the terminal device. In a possible case, when the transmit beam is the transmit beam of the network device, for example, in downlink TRP beam refinement (DL TRP beam refinement) shown in (5) in FIG. 3, the network device sends reference signals to the terminal device by using different transmit beams, and the terminal device receives, by using a same receive beam, the reference signals that are sent by the network device by using the different transmit beams, and determines an optimal transmit beam of the network device based on the received signals. Then, the terminal device feeds back the optimal transmit beam of the network device to the network device, to facilitate update of the transmit beam by the network device. In still another possible case, when the transmit beam is the transmit beam of the terminal device, for example, in uplink terminal device beam refinement (UL UE beam refinement) shown in (4) in FIG. 3, the terminal device sends reference signals to the network device by using different transmit beams, and the network device receives, by using a same receive beam, the reference signals that are sent by the terminal device by using the different transmit beams, and determines an optimal transmit beam of the terminal device based on the received signals. Then, the optimal transmit beam of the terminal device is fed back to the terminal device, to facilitate update of the transmit beam by the terminal device. The process of sending the reference signals by using the different transmit beams may be referred to as beam sweeping, and the process of determining the optimal transmit beam based on the received signals may be referred to as beam matching.

The receive beam is updated. The receive beam may be the receive beam of the network device, or may be the receive beam of the terminal device. In a possible case, when the receive beam is the receive beam of the network device, for example, in uplink TRP beam refinement (UL TRP beam refinement) shown in (6) in FIG. 3, the terminal device sends reference signals to the network device by using a same transmit beam, and the network device receives, by using different receive beams, the reference signals sent by the terminal device. Then, the network device determines an optimal receive beam of the network device based on the received signal, to update the receive beam of the network device. In still another possible case, when the receive beam is the receive beam of the terminal device, for example, downlink terminal device beam refinement (DL UE beam refinement) shown in (3) in FIG. 3, the network device sends reference signals to the terminal device by using a same transmit beam, and the terminal device receives, by using different receive beams, the reference signals sent by the network device. Then, the terminal device determines the optimal receive beam of the terminal device based on the received signals, to update the receive beam of the terminal device.

During transmission of a downlink signal, both the transmit beam of the network device and the receive beam of the terminal device may dynamically change, and there may be a plurality of optimal receive beams that are determined by the terminal device based on the received signals. To enable the terminal device to determine the receive beam of the terminal device, the terminal device may feed back information about the plurality of receive beams to the network device. The network device may indicate the receive beam of the terminal device to the terminal device by sending beam indication information to the terminal device. When the terminal device uses analog beamforming, the terminal device may precisely determine the receive beam of the terminal device based on the beam indication information sent by the network device. Therefore, beam sweeping time of the terminal device can be reduced, and power is saved.

In the beam training process, the network device obtains N BPLs that have relatively good communication with the terminal device, where the BPLs include <Bx, B'x> and <By, B'y>. Bx represents the transmit beam of the network device, B'x represents the receive beam of the terminal device, By represents the transmit beam of the terminal device, and B'y represents the receive beam of the network device. In a subsequent communication process between the network device and the terminal device, the network device and the terminal device transmit data by using the N BPLs.

An obstacle exists in a communication process, and a diffraction capability on a high frequency channel is poor. Consequently, a current serving beam is blocked, and signal transmission cannot proceed. To prevent sudden communication interruption caused by beam blocking, a corresponding mechanism needs to be introduced to detect beam quality and quickly recover a link when the beam is blocked.

Figure 4:
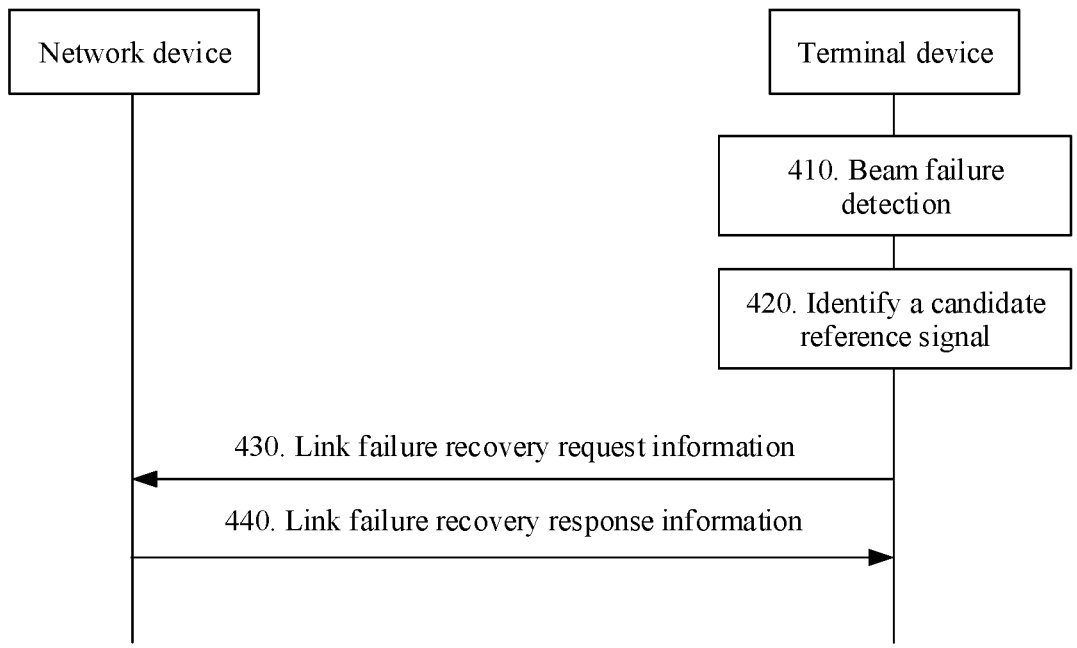
FIG. 4 is a schematic diagram of a link failure recovery procedure.

FIG. 4 is a schematic diagram of a link failure recovery procedure. As shown in FIG. 4, the following steps may be included.

410. Perform beam failure detection.

A terminal device measures a beam failure detection reference signal set (beam failure detection RS set), to determine that a link between the terminal device and a network device fails.

There are many manners for the terminal device to determine that the link between the terminal device and the network device fails. This is not limited in this embodiment of this application. For example, when the terminal device determines that channel quality information of all or some reference signals in reference signals for beam failure detection performed for N consecutive times (beam failure detection RS) or in a beam failure detection RS set is less than or equal to a link failure detection threshold, the terminal device may determine that the link between the terminal device and the network device fails. N is an integer greater than or equal to 1.

420. Identify a candidate reference signal.

The terminal device may identify a reference signal in a candidate reference signal set (candidate beam identification RS), and the terminal device may recover a link based on the reference signal. A process in which the terminal device identifies the reference signal may be understood as that the terminal device determines, in the candidate reference signal set, a reference signal (new identified beam) whose channel quality is greater than or equal to a link failure recovery threshold.

430. The terminal device sends link failure recovery request information to the network device.

440. The network device sends link failure recovery response information to the terminal device.

In step 430, in other words, the terminal device may send beam failure recovery request (beam failure recovery request, BFRQ) information to the network device, and the terminal device may indicate information such as cell information of a link failure cell to the network device by using the BFRQ information.

Before the terminal device sends the link failure recovery request information, the network device cannot learn of a quantity of cells in which a link failure occurs. Therefore, resources are usually reserved based on a maximum quantity of cells in which a link failure may occur.

In addition, generally, the terminal device reports the BFRQ information by using a MAC-CE. A MAC-CE indicating the link failure recovery request information may indicate cell information of a plurality of link failure cells. When the network device allocates a resource for the link failure recovery request information to the terminal device, because the network device does not know the quantity of cells in which a link failure occurs, a MAC-CE format is usually designed based on the maximum quantity of cells in which a link failure may occur.

In this case, when the terminal device determines that a link failure occurs in only one or a few cells in configured cells, and the link failure recovery request information needs to be sent, a resource waste is caused.

In view of this, this application provides a method, to properly allocate a resource and reduce a resource waste.

The following describes in detail various embodiments provided in this application with reference to the accompanying drawings.

Figure 5:
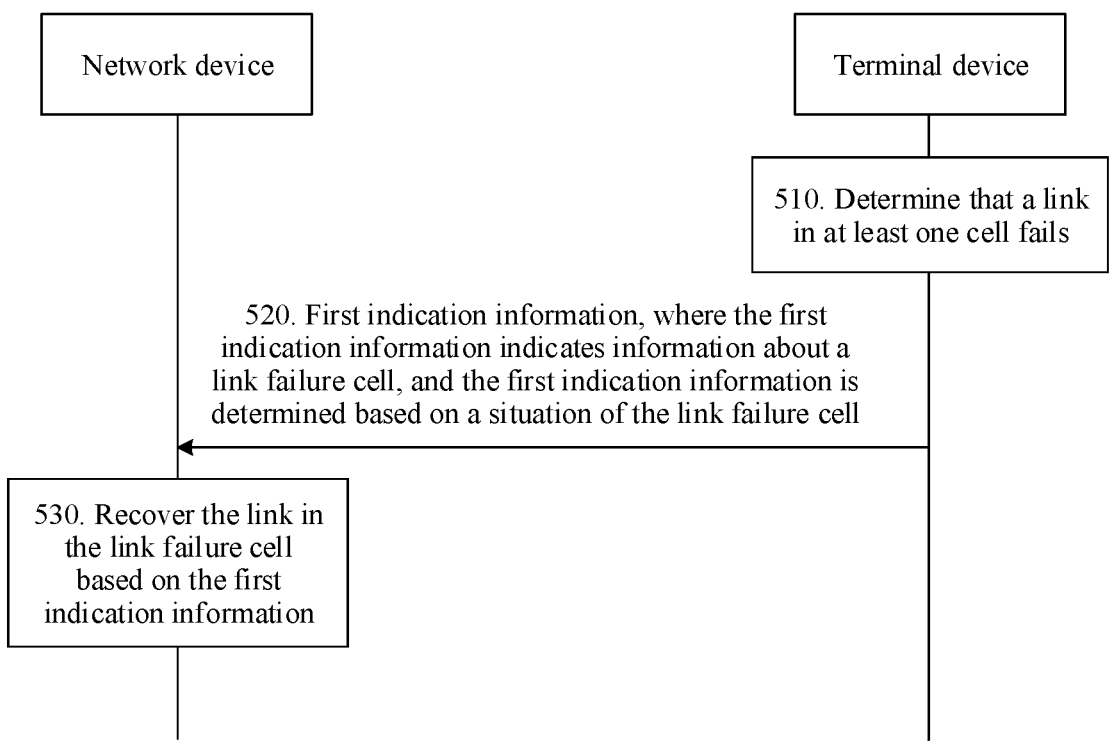
FIG. 5 is a schematic interaction diagram of a communication method according to an embodiment of this application.

FIG. 5 is a schematic interaction diagram of a method 500 according to an embodiment of this application. The method 500 may include the following steps.

510. Determine that a link in at least one cell fails.

A terminal device determines that the link in the at least one cell fails. In other words, the terminal device determines that links in one or more cells fail, or the terminal device detects that a link failure occurs in one or more cells. A cause of the link failure is not limited in this embodiment of this application. For example, when a beam is blocked or signal quality deteriorates, a link may fail.

There are many manners for the terminal device to determine that the link between the terminal device and the cell fails.

For example, when the terminal device determines that channel quality of a reference signal used for beam failure detection in the cell is lower than a preset threshold for N consecutive times, or when the terminal device determines that channel quality of all or some reference signals in a reference signal set used for beam failure detection in the cell is lower than a preset threshold for N consecutive times, the terminal device may determine that the link between the terminal device and the cell fails. N is an integer greater than or equal to 1. The preset threshold, or referred to as a link failure detection threshold or a link failure threshold, may be a preconfigured or predefined threshold. This is not limited in this embodiment of this application.

For another example, it is assumed that a reference signal in a beam failure detection reference signal set meets a QCL relationship with a demodulation reference signal of a PDCCH, or use a same TCI state as the PDCCH. When channel quality information (for example, RSRP, a CQI, a BLER, an SINR, and an SNR) of some or all reference signals in the reference signal set is lower than a beam failure detection threshold, it is determined that a beam failure occurs. The beam failure detection threshold may also be referred to as a predetermined threshold, may be referred to as a link failure detection threshold, or may be referred to as a link failure threshold. It should be understood that any threshold used for link failure detection may be the beam failure detection threshold. A name of the beam failure detection threshold is not limited in this embodiment of this application. Optionally, the beam failure detection threshold may be configured by a network device, or may be a threshold that is the same as a radio link failure out-of-synchronization threshold (radio link failure OOS (out of sync)). Optionally, when the network device configures the beam failure detection threshold, the beam failure detection threshold is used to detect a beam failure. When the network device does not configure the beam failure detection threshold, the radio link out-of-synchronization threshold may be used as the beam failure detection threshold to detect a beam failure.

It should be understood that a manner for the terminal device to determine that the link between the terminal device and the cell fails is not limited in this embodiment of this application, and any manner used by the terminal device to determine that the link between the terminal device and the cell fails is applicable to this embodiment of this application.

520. The terminal device sends first indication information to the network device, where the first indication information indicates information about a link failure cell, and the first indication information is determined based on a situation of the link failure cell.

The terminal device sends the first indication information to the network device, and the network device may recover the link failure cell based on the first indication information.

It should be understood that, that the terminal device sends first indication information to the network device may be: the terminal device sends the first indication information to the network device, and the network device recovers the failed link between the terminal device and the network device. Alternatively, that the terminal device sends first indication information to the network device may be: The terminal device sends the first indication information to another network device, and the another network device recovers the failed link between the terminal device and the network device.

The information about the link failure cell may include: identification information of the link failure cell, and/or reference signal information, where the reference signal information is used to recover the link in the link failure cell. It may be understood that the reference signal information and the identification information of the link failure cell may be separately sent to the network device, or may be sent together to the network device by using the first indication information. For example, the information about the link failure cell may include the identification information of the link failure cell; the information about the link failure cell may include the reference signal information; or the information about the link failure cell may include the identification information of the link failure cell and the reference signal information. In other words, the first indication information may indicate the identification information of the link failure cell; the first indication information may indicate the reference signal information; or the first indication information may indicate the identification information of the link failure cell and the reference signal information.

The reference signal information may include an index of a reference signal resource and/or channel quality (for example, one or more of the following: RSRP, an SINR, RSRQ, a CQI, or an SNR) of a reference signal. For example, the reference signal resource may include a CSI-RS resource and/or an SSB resource.

The reference signal information may be understood as reference signal resource information. The reference signal resource information includes an index of a reference signal resource and/or channel quality (for example, one or more of the following: RSRP, an SINR, RSRQ, a CQI, or an SNR) of a reference signal on the reference signal resource.

The first indication information may be, for example, a MAC-CE. That is, the MAC-CE may be used to indicate BFRQ information. For brevity, the first indication information is uniformly used in the following descriptions.

In a possible implementation, that the first indication information indicates information about a link failure cell may include: the first indication information indicates an identifier (identity, ID) (or referred to as an index (index, ID)) of the link failure cell. The following uses an ID of a cell as an example for description. For example, assuming that a link failure occurs in a first cell and a second cell, the terminal device may indicate information about the first cell and the second cell to the network device, for example, an ID of the first cell and an ID of the second cell. The terminal device sends the first indication information to the network device, so that the network device can learn of cells in which a link failure occurs.

Optionally, a quantity of link failure cells that are reported by the terminal device may be less than or equal to a quantity of detected link failure cells. For example, it is assumed that in step 510, the terminal device determines that links in T1 cells fail. In step 520, the first indication information sent by the terminal device may carry information about T2 cells, for example, indicate identifiers (or referred to as indexes (index, ID)) of the T2 cells. Both T1 and T2 are integers greater than or equal to 1, and T1 is greater than or equal to T2. For ease of description, an example in which the quantity of link failure cells that are reported by the terminal device is equal to the quantity of detected link failure cells is used below for description.

In another possible implementation, that the first indication information indicates information about a link failure cell may include: the first indication information indicates the reference signal information. In other words, the first indication information may further report information used to recover a new link in the link failure cell. The reference signal information is used to recover the link in the link failure cell. For example, the first indication information may indicate T3 pieces of reference signal information used to recover links in the T2 cells. T3 is an integer greater than or equal to 1.

Optionally, the situation of the link failure cell may include one or more of the following: a quantity of link failure cells, a payload (payload) of the information about the link failure cell, whether a situation of a reference signal used to recover the link failure cell is identified, and so on.

That the first indication information is determined based on a situation of the link failure cell may include the following solutions:

Solution 1: A format of the first indication information is determined based on the situation of the link failure cell.

Solution 2: A resource for carrying the first indication information is determined based on the situation of the link failure cell.

The following describes the foregoing solution 1 and solution 2 in detail.

530. The network device recovers the link in the link failure cell based on the first indication information.

After receiving the first indication information, the network device recovers links in some or all cells in the link failure cell indicated by the first indication information.

For example, it is assumed that in step 520, the terminal device reports, by using the first indication information, that link failures occur in the T2 cells. In this case, after receiving the first indication information, the network device recovers links in T4 cells. The T4 cells belong to the T2 cells. T4 is an integer greater than or equal to 1, and T4 is less than or equal to T2.

The following describes the solution 1 and the solution 2 in detail.

Solution 1: A format of the first indication information is determined based on the situation of the link failure cell.

First, the format of the first indication information is described.

Optionally, the format of the first indication information may be a first format, or may be a second format. For example, the first format may be referred to as a short format, and the second format may be referred to as a long format; or the first format may be referred to as a single entry (single entry), and the second format may be referred to as a multi entry (multi entry).

It should be understood that the first format, the short format, or the single entry is merely a name, and does not limit the protection scope of this embodiment of this application. The second format, the long format, or the multi entry is merely a name, and does not limit the protection scope of this embodiment of this application. The following uniformly uses the first format and the second format for description.

Optionally, the first format and the second format satisfy one or more of the following conditions:
- a quantity of bits occupied by the first indication information in the first format is less than a quantity of bits occupied by the first indication information in the second format; or
- the first indication information in the first format indicates information about N1 link failure cells, and the first indication information in the second format indicates information about N2 link failure cells, where N1 and N2 are integers greater than or equal to 1, and N1<N2. In other words, a quantity of link failure cells indicated by the first indication information in the first format is less than a quantity of link failure cells indicated by the first indication information in the second format; or
- a payload of information included in the first indication information in the first format is less than a payload of information included in the first indication information in the second format.

It should be understood that the foregoing two formats are merely examples for description, and this embodiment of this application is not limited thereto. For example, more formats may be designed.

It should be further understood that the bit quantity, the quantity of pieces of information about the link failure cell, and the payload may all refer to a maximum value. For example, the first indication information in the first format indicates the information about the N1 link failure cells. This indicates that the first indication information in the first format indicates the information about a maximum of the N1 link failure cells.

It may be understood that, in consideration of the situation of the link failure cell, for example, in consideration of the quantity of link failure cells, the first indication information in a plurality of formats may be predefined. For example, the first indication information in two formats (the first format and the second format) is predefined, so that the first indication information in an appropriate format is selected based on the situation of the link failure cell, thereby reducing a resource waste.

The following separately describes cases in which the format of the first indication information is the first format and the format of the first indication information is the second format.

(1) The format of the first indication information is the first format.

Optionally, the first indication information in the first format may include one or more of the following: a serving cell identifier field (a serving cell ID field), a first field, a second field, or a reserved bit.

The serving cell ID field may indicate an ID of a link failure cell by using a state value.

It should be understood that the serving cell ID field is merely a name, and does not limit the protection scope of the embodiments of this application. In the embodiments of this application, another name may be used to indicate a same meaning in a future protocol. The following is described by using the serving cell ID field as an example.

The first indication information in the first format may report an ID of a link failure cell by using a state value. For example, the first indication information includes a serving cell ID field, and the serving cell ID field indicates an ID of a link failure cell by using a state value. For another example, the first indication information includes a SCellIndex field, and the SCellIndex field indicates, by using a state value, an ID of a serving cell with a link failure. The serving cell ID field may be referred to as a ServCellIndex field or a SCellIndex field.

For example, if the network device configures a total of X (that is, a maximum of X) serving cells for a terminal device, or the network device configures, for a terminal device, a total of X serving cells that require link failure detection, or the network device configures, for a terminal device, a total of X serving cells in which link failure recovery can be performed, the serving cell identifier field indicates, by using [log 2(X)] bits, a specific cell that is in these cells and in which a link failure occurs. X is an integer greater than 1 or equal to 1, and [log 2(X)] represents rounding up log 2(X). It should be understood that the rounding manner herein may alternatively be rounding down, rounding off, or the like.

For example, X=31. In this case, 5 bits (bit) may be used to indicate an ID of a link failure cell. For example, 00001 indicates that a link failure occurs in a cell whose cell ID is 1, 00010 indicates that a link failure occurs in a cell whose ID is 2, and so on.

The first field may also be referred to as a B filed, and the B field indicates whether a link failure cell indicated by a corresponding serving cell ID field has a corresponding second field. The following uses a B field as an example for description.

It should be understood that both the first field and the B field are merely names, and do not limit the protection scope of the embodiments of this application. In the embodiments of this application, another name may be used to indicate a same meaning in a future protocol. The following is described by using the B field as an example.

The second field may also be referred to as a new beam indication (new beam info) field, and the new beam info field indicates information about a reference signal used to recover a link in a link failure cell indicated by the serving cell ID field. The new beam info may be an index of a reference signal resource.

It should be understood that both the second field and the new beam info field are merely names, and do not limit the protection scope of the embodiments of this application. In the embodiments of this application, another name may be used to indicate a same meaning in a future protocol. The following is described by using the new beam info field as an example.

The information about the reference signal includes the index of the reference signal resource and/or channel quality of the reference signal. The channel quality may include one or more of the following: reference signal received power (reference signal receiving power, RSRP), a signal to interference plus noise ratio (signal to interference plus noise ratio, SINR), reference signal received quality (reference signal receiving quality, RSRQ), a channel quality indicator (channel quality indication, CQI), a signal-to-noise ratio (signal noise ratio, SNR), and the like.

It should be understood that the reference signal resource may be one or more reference signal resources in the candidate reference signal resource set.

The B field indicates whether the link failure cell indicated by the serving cell ID field has a corresponding new beam info field may be understood as: the B field indicates whether there is a new beam info field, or the B field indicates whether there is a reference signal used for link recovery, or the B field indicates whether there is a reference signal resource used for link recovery.

Each cell indicated by the serving cell ID field may have a corresponding B field.

Optionally, one link failure cell corresponds to one bit in the B field, or one link failure cell corresponds to one 1-bit B field. For example, the link failure cell includes a first cell and a second cell, and the serving cell identifier field is used to indicate that a link failure occurs in the first cell and the second cell. A B field corresponding to the first cell indicates whether the first cell has a second field, and a B field corresponding to the second cell indicates whether the second cell has a second field.

For example, the first indication information in the first format may include a maximum of two bytes (a first byte and a second byte), and the first byte includes the B field (the first byte may further include the serving cell identifier field). When the B field is 0, the second byte has no content, or content of the second byte is the same as content of the first byte, or the second byte has no new beam info field. When the B field is 1, the second byte has content, or the second byte has the new beam info field. Alternatively, when the B field is 1, the second byte has no content, or content of the second byte is the same as content of the first byte, or the second byte has no new beam info field. When the B field is 0, the second byte has content, or the second byte has the new beam info field.

Figure 6:
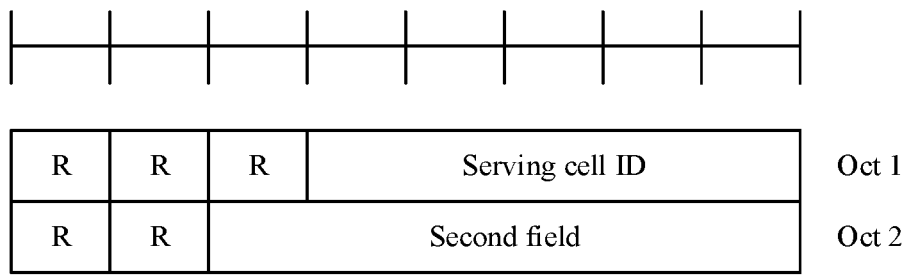
Figure 7:
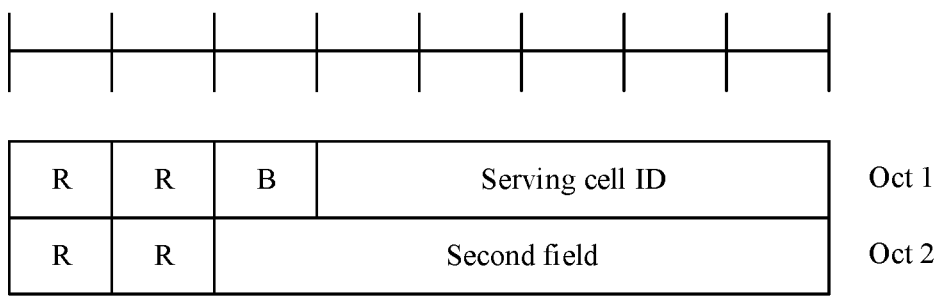

As shown in FIG. 6 or FIG. 7, one octet (Oct, Octet) represents one byte (byte) formed by eight bits (bits). FIG. 6 or FIG. 7 includes two octs, which are denoted as Oct 1 and Oct 2 for differentiation. As shown in FIG. 6 or FIG. 7, the MAC-CE includes two bytes: a first byte Oct 1 and a second byte Oct 2. In the example shown in FIG. 6 or FIG. 7, the second byte has content, or the second byte has the new beam info field.

It should be understood that the first byte and the second byte are merely names for distinguishing, and do not limit the protection scope of the embodiments of this application.

It should be understood that, a cell is used as an example. A relationship among the serving cell ID field, the B field, and the new beam info field may be as follows: The serving cell ID field indicates an ID of a link failure cell, the B field indicates whether the cell has a new beam info field, and the new beam info field indicates information about a reference signal used to recover a link in the cell.

It should be further understood that, for each cell indicated by the serving cell ID field, there may be a B field corresponding to the cell, the B field is used to indicate whether the cell has the new beam info field, and the new beam info field indicates information about a reference signal used to recover a link in the cell.

The reserved bit (reserved bit) (R bit) is generally set to 0. The R bit generally does not indicate any information.

The foregoing describes, as an example, content that may be included when the first indication information is in the first format. It should be understood that this embodiment of this application is not limited thereto. In addition, there may be a plurality of forms when the first indication information is in the first format. The following provides descriptions with reference to several cases by using an example in which the first indication information is a MAC-CE.

In the following cases, a serving cell identifier is a serving cell ID.

Case 1: If X=31, and a reference signal resource set (candidate beam list) used to recover a cell link have a maximum of 64 reference signal resources, the MAC-CE in the first format may occupy two bytes.

In Case 1, the MAC-CE may be at least in any one of the forms shown in Example 1 and Example 2.

Example 1: Table 1 and FIG. 6 show a possible MAC CE format for indicating BFRQ information by using a MAC-CE, and there is no B field in the format.

As shown in FIG. 6, the MAC-CE may include a serving cell ID field, a new beam info field, and a reserved bit.

The serving cell ID field occupies 5 bits and indicates an ID that is of a link failure cell and that is indicated by the MAC-CE.

The new beam info field occupies 6 bits and indicates an index of a reference signal resource used to recover a link failure cell indicated by the serving cell ID field.

"R" represents a reserved bit and is generally set to "0".

TABLE 1

| R | R | R | Serving cell identifier (serving cell ID) |
|---|---|---|---|
| R | R |   | new beam info |

Example 2: Table 2 and FIG. 7 show a possible MAC CE format for indicating BFRQ information by using a MAC-CE, and there is a B field in the format.

As shown in FIG. 7, one oct represents one byte formed by 8 bits. In FIG. 7, two octs are included, and are denoted as Oct 1 and Oct 2 for distinguishing. As shown in FIG. 7, the MAC-CE may include a serving cell ID field, a new beam info field, a B field, and a reserved bit.

The serving cell ID field occupies 5 bits and indicates an ID of a link failure cell indicated by the MAC-CE.

The B field occupies 1 bit and indicates whether there is a reference signal used to recover a link failure cell indicated by the serving cell ID field. Further, if the B field is "1", it indicates that the new beam info field exists. If the B field is "0", it indicates that the new beam info field does not exist. Certainly, meanings of values "1" and "0" are merely examples, and this application is not limited thereto.

The new beam info field occupies 6 bits and indicates an index of a reference signal resource used to recover a link failure cell indicated by the serving cell ID field.

"R" represents a reserved bit (Reserved bit), and is generally set to "0".

TABLE 2

| R | R | B | Serving cell identifier (serving cell ID) |
| R | R | | new beam info |

Case 2: If X is less than or equal to 8, and a reference signal resource set (candidate beam list) used to recover a cell link has a maximum of 16 reference signal resources, the MAC-CE in the first format may occupy one byte.

In Case 2, the MAC-CE may be at least in any one of the forms shown in Example 3 and Example 4.

Example 3: Table 3 and FIG. 8 show a possible MAC CE format for indicating BFRQ information by using a MAC-CE, and there is no B field in the format.

Figure 8:
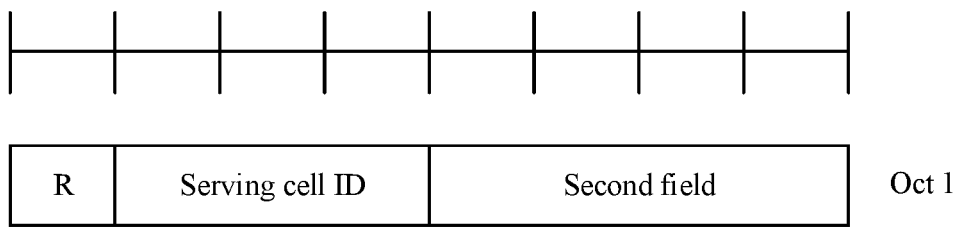

As shown in FIG. 8, one oct represents one byte formed by 8 bits. In FIG. 8, one oct is included, and is denoted as Oct 1. As shown in FIG. 8, the MAC-CE may include a serving cell ID field, a new beam info field, and a reserved bit.

The serving cell ID field occupies 3 bits and indicates an ID of a link failure cell indicated by the MAC-CE.

The new beam info field occupies 4 bits and indicates an index of a reference signal resource used to recover a link failure cell indicated by the serving cell ID field.

"R" represents a reserved bit (Reserved bit) and is generally set to "0".

TABLE 3

| R | Serving cell identifier (serving cell ID) | new beam info |

Example 4: Table 4 and FIG. 9 show a possible MAC CE format for indicating BFRQ information by using a MAC-CE, and there is a B field in the format.

Figure 9:
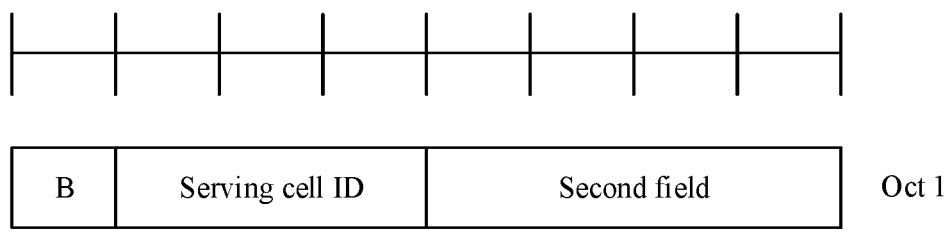

As shown in FIG. 9, one oct represents one byte formed by 8 bits. In FIG. 9, one oct is included, and is denoted as Oct 1. As shown in FIG. 9, the MAC-CE may include a serving cell ID field, a new beam info field, and a B field.

The serving cell ID field occupies 3 bits and indicates an ID of a link failure cell indicated by the MAC-CE.

The B field occupies 1 bit and indicates whether there is a reference signal used to recover a link failure cell indicated by the serving cell ID field. Further, if the B field is "1", it indicates that the new beam info field exists. If the B field is "0", it indicates that the new beam info field does not exist. Certainly, meanings of values "1" and "0" are merely examples, and this application is not limited thereto.

The new beam info field occupies 4 bits and indicates an index of a reference signal resource used to recover a link failure cell indicated by the serving cell ID field.

TABLE 4

| B | Serving cell identifier (serving cell ID) | new beam info |

Case 3: If X is less than or equal to 8, and a reference signal resource set (candidate beam list) used to recover a cell link have a maximum of 32 reference signal resources, the MAC-CE in the first format may occupy one byte.

In Case 3, the MAC-CE may be at least in the form shown in Example 5.

Example 5: Table 5 shows a possible MAC CE format for indicating BFRQ information by using a MAC-CE, and there is no B field in the format. Alternatively, the MAC-CE format may be that shown in FIG. 10, As shown in FIG. 10, one oct represents one byte formed by 8 bits. In FIG. 10, one oct is included, and is denoted as Oct 1. As shown in FIG. 10, the MAC-CE may include a serving cell ID field and a new beam info field.

The serving cell identifier field occupies 3 bits and indicates an ID of a link failure cell indicated by the MAC-CE.

The new beam info field occupies 5 bits and indicates an index of a reference signal resource used to recover a link failure cell corresponding to the serving cell identifier field.

TABLE 5

| Serving cell identifier (serving cell ID) | new beam info |

Case 4: If X is less than or equal to 16, and a reference signal resource set (candidate beam list) used to recover a cell link have a maximum of 16 reference signal resources, the MAC-CE in the first format may occupy one byte.

In Case 4, the MAC-CE may be at least in the form shown in Example 6.

Example 6: Table 6 and FIG. 11 show a possible MAC CE format for indicating BFRQ information by using a MAC-CE, and there is no B field in the format.

As shown in FIG. 11, one oct represents one byte formed by 8 bits. In FIG. 11, one oct is included, and is denoted as Oct 1. As shown in FIG. 11, the MAC-CE may include a serving cell ID field and a new beam info field.

The serving cell ID field occupies 4 bits and indicates an ID of a link failure cell indicated by the MAC-CE.

The new beam info field occupies 4 bits and indicates an index of a reference signal resource used to recover a link failure cell indicated by the serving cell ID field.

TABLE 6

| Serving cell identifier (serving cell ID) | new beam info |

The foregoing describes several cases as examples. It should be understood that the embodiments of this application are not limited thereto, and any variation falling within the foregoing several cases falls within the protection scope of the embodiments of this application.

The foregoing describes the case in which the format of the first indication information is the first format, and the following describes a case in which the format of the first indication information is the second format.

(2) The format of the first indication information is the second format.

Optionally, the first indication information in the second format may include one or more of the following: a serving cell ID field, a B field, a new beam info field, or a reserved bit.

The serving cell ID field may indicate an ID of a link failure cell by using a bitmap. Each bit in the bitmap may correspond to one Ci field. It is assumed that, if a value of the Ci field is 1, it indicates that a link failure occurs in a cell corresponding to the Ci field. In this case, if the serving cell ID field indicates IDs of T2 link failure cells, it may be understood as that T2 Ci fields in the serving cell ID field have a value of 1. The $C_0$ field may be an R field.

The first indication information in the second format may report the ID of the link failure cell by using a bitmap (bitmap). For example, the first indication information includes an indication field, for example, denoted as a Ci field. The Ci field indicates the ID of the link failure cell (or an ID of a link failure SCell, or an ID of a link failure serving cell) by using the bitmap. The Ci field is merely a name for distinguishing, and does not limit the protection scope of the embodiments of this application. i is an integer greater than 0 or equal to 0.

Optionally, when the Ci field is 1, it indicates that a link failure occurs in a cell whose cell ID is i, or indicates that a link failure occurs in a SCellIndex i, or indicates that a link failure occurs in a ServCellIndex i, or indicates that a link failure occurs in an $i^{th}$ cell among cells that require link failure detection, or a link failure occurs in an $i^{th}$ cell in activated cells, or indicates that a link failure occurs in an $i^{th}$ cell in serving cells configured by the network device for the terminal device.

Optionally, the Ci field may further indicate whether a new beam info field corresponding to a cell whose ID is i exists. For example, when the Ci field is 1, the Ci field indicates that a new beam info field corresponding to a cell whose ID is i exists, or the Ci field may further indicate that a new beam info field corresponding to a SCellIndex i exists, or indicate that a new beam info field corresponding to a ServCellIndex i exists, or indicate that a new beam info field corresponding to an $i^{th}$ cell in cells that require link failure detection exists, or indicate a new beam info field corresponding to an $i^{th}$ cell in activated cells exists, or indicate a new beam info field corresponding to an $i^{th}$ cell in serving cells configured by the network device for the terminal device exists. When the Ci field is 0, the Ci field indicates that a new beam info field corresponding to a cell whose ID is i does not exist, or indicates that a new beam info field corresponding to a SCellIndex i does not exist, or indicates that a new beam info field corresponding to a ServCellIndex i does not exist, or indicates that a new beam info field corresponding to an $i^{th}$ cell in cells that require link failure detection does not exist, or a new beam info field corresponding to an $i^{th}$ cell in activated cells does not exist, or indicates that a new beam info field corresponding to an $i^{th}$ cell in serving cells configured by the network device for the terminal device does not exist.

For example, the network device configures a total of X serving cells for a terminal device, or the network device configures, for a terminal device, a total of X serving cells that require link failure detection, or the network device configures, for a terminal device, a total of X serving cells in which link failure recovery can be performed. In this case, there may be X Ci fields, where i may be greater than or equal to 1, and i is less than or equal to X. That is, X bits may be used to indicate which cells in these cells have a link failure.

Optionally, the field included in the first indication information in the second format may include the following several cases.

Case 1: The first indication information in the second format may include X Ci fields and m second fields. In the X Ci fields, there are m Ci fields in total whose values are 1, and the m Ci fields whose values are 1 are in a one-to-one correspondence with the m second fields. m is an integer less than or equal to X.

Case 2: The first indication information in the second format may include X Ci fields, b first fields, and m second fields. In the X Ci fields, there are b Ci fields in total whose values are 1, and the b Ci fields whose values are 1 are in a one-to-one correspondence with the b first fields. In the b first fields, there are m first fields in total whose values are 1, and the m first fields whose values are 1 are in a one-to-one correspondence with the m second fields. b is an integer less than or equal to X, and m is an integer less than or equal to b.

Case 3: The first indication information in the second format may include X Ci fields, X first fields, and m second fields. The X Ci fields are in a one-to-one correspondence with the X first fields. In the X Ci fields, there are m1 Ci fields in total whose values are 1. In the X first fields, there are m2 first fields whose values are 1. There are m Ci fields and m first fields whose values are 1, and the Ci fields and the first fields are in a correspondence. The m Ci fields whose values are 1 and first fields are in a one-to-one correspondence with the m second fields. m1 and m2 are integers less than or equal to X. Optionally, m1 and m2 are integers greater than or equal to m.

The foregoing one-to-one correspondence may be understood as a sequential correspondence.

The foregoing three cases are merely examples, and there may be another possible case. This is not limited in this embodiment of this application.

For example, if X=31, 31 bits are used to indicate an ID of a link failure cell. For example, both a C5 field and a C7 field are 1, indicating that link failures occur in a cell whose cell ID is 5 and a cell whose cell ID is 7.

For the B field, the new beam info field, and the reserved bit, refer to the descriptions (that is, the descriptions about the first format in "(1)" above) in which the format of the first indication information is the first format. Details are not described herein again.

Figure 13:
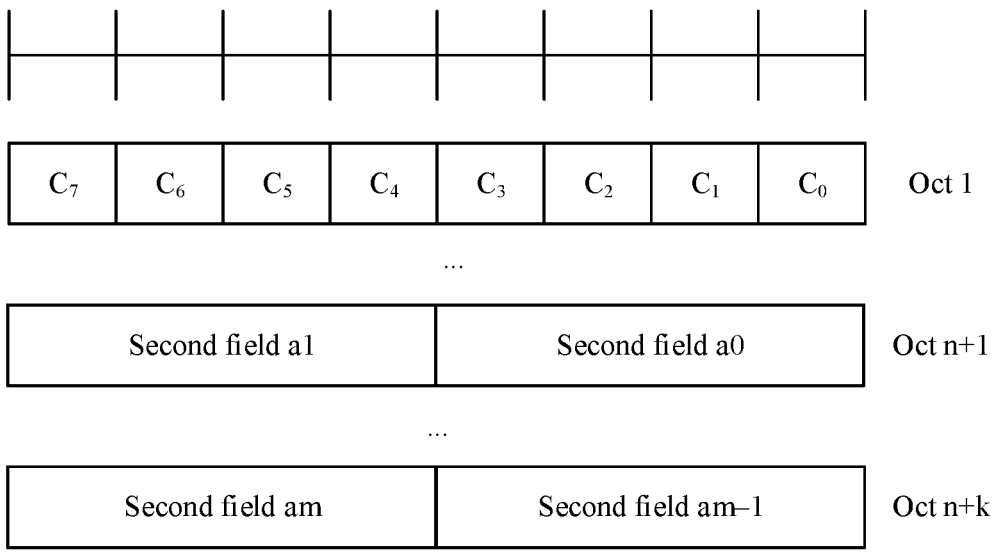
Figure 14:
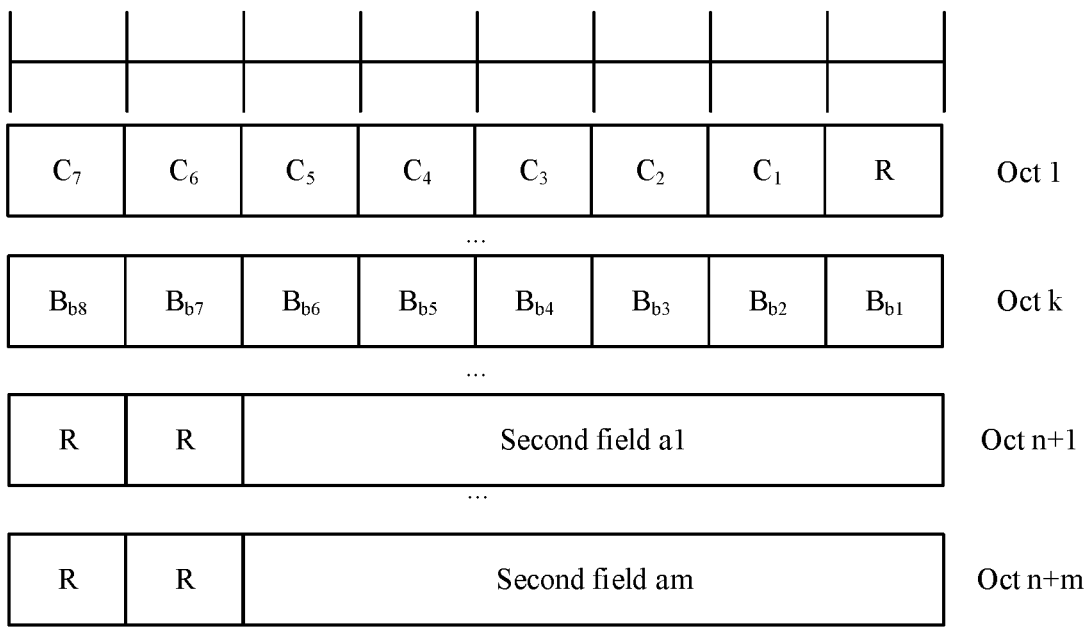

Similarly, when the first indication information is in the second format, there may be a plurality of forms, for example, three possible forms in FIG. 12 to FIG. 14.

For example, FIG. 12 is used as an example.

The serving cell ID field indicates IDs of m cells (which may be understood as that m Ci fields in the serving cell ID field have a value of 1). This may be understood as that link failures occur in the m cells, where m is an integer greater than 1 or equal to 1. The serving cell ID field indicates the IDs of the m cells, and correspondingly, the m cells correspond to m second fields. For example, FIG. 12 includes a reserved field R, and FIG. 12 may include m second fields. For distinguishing, the m second fields are denoted as a second field 1, a second field 2, . . . , and the like. The $C_0$ field may be an R field, that is, the $C_0$ field may include a reserved field.

For another example, FIG. 13 is used as an example.

The serving cell ID field indicates IDs of (m+1) cells (which may be understood as that (m+1) Ci fields in the serving cell ID field have a value of 1). This may be understood as that link failures occur in the (m+1) cells. The serving cell ID field indicates the IDs of the (m+1) cells, and correspondingly, the (m+1) cells correspond to (m+1) second fields. For example, FIG. 13 does not include a reserved field R, and FIG. 13 may include (m+1) second fields. For distinguishing, the second fields are denoted as a second field a0, a second field a1, a second field a2, a second field am, . . . , and the like. The $C_0$ field may be an R field, that is, the $C_0$ field may include a reserved field.

For another example, FIG. 14 is used as an example.

The serving cell ID field indicates IDs of p1 cells (which may be understood as that the p1 Ci fields in the serving cell ID field have a value of 1). This may be understood as that link failures occur in the p1 cells, where p1 is an integer greater than 1 or equal to 1. The serving cell ID field indicates the IDs of the p1 cells. Correspondingly, the p1 cells may correspond to p2 first fields (Bi field), where p2 is an integer greater than 1 or equal to 1.

Optionally, p2 may be equal to p1, a $B_{bj}$ field corresponds to a jth cell in link failure cells indicated by the serving cell ID field, and $B_{bj}$ may be equal to $B_j$. $B_{bj}$ represents a $(bj)^{th}$ B field, for example, bj=1, and $B_{bj}$ indicates the first B field, that is, $B_1$ (that is, j=1). Alternatively, p2 may be equal to X, and a $B_{bj}$ field corresponds to a $(b_j)^{th}$ cell in X cells. Correspondingly, the p2 first fields indicate that there are m second fields (which may be understood as that m Bi fields have a value of 1). The m first fields respectively sequentially correspond to cells whose $B_{bj}$ fields have a value of 1. For example, FIG. 14 includes a reserved field R, and FIG. 14 may include m second fields. For distinguishing, the m second fields are denoted as a second field a1, a second field a2, . . . , and the like.

The foregoing describes, with reference to FIG. 12 to FIG. 14, several possible forms in which the format of the first indication information is the second format. It should be understood that this embodiment of this application is not limited thereto.

Optionally, if the terminal device cannot identify the reference signal used to recover the link failure cell, the first indication information in the first format or the second format may indicate, in either of the following two manners, the reference signal information used to recover the link failure cell.

Manner 1: The first indication information does not include a B field, but includes a new beam info field, the new beam info field indicates reference signal information used to recover a link failure cell, and when the terminal device identifies a reference signal whose quality is greater than a link failure recovery threshold, the new beam info field may indicate information such as a resource index of a reference signal; otherwise, the new beam info field may be a special state value indicating that there is no reference signal (or in other words, a reference signal used to recover a link failure cell is not identified) greater than the link failure recovery threshold.

Manner 2: The first indication information includes a B field and a new beam info field, and the B field indicates whether there is a reference signal greater than a link failure recovery threshold (or in other words, whether a reference signal used to recover a link failure cell is identified). If the B field indicates that the reference signal used to recover the link failure cell is identified, the new beam info field exists, and the new beam info field indicates information such as a resource index of the reference signal used to recover the link failure cell.

The foregoing describes two formats as an example: the first format (namely, the first format) and the second format (namely, the second format). It should be understood that this embodiment of this application is not limited thereto. For example, further division may be performed. For example, the first format, the second format, and the third format may be included. A quantity of bits occupied by the first indication information in the first format is less than a quantity of bits occupied by the first indication information in the second format, and the quantity of bits occupied by the first indication information in the second format is less than a quantity of bits occupied by the first indication information in the third format. Alternatively, a quantity that is of link failure cells and that is indicated by the first indication information in the first format is less than a quantity that is of link failure cells and that is indicated by the first indication information in the second format, and the quantity that is of link failure cells and that is indicated by the first indication information in the second format is less than a quantity that is of link failure cells and that is indicated by the first indication information in the third format. Alternatively, a payload of information included in the first indication information in the first format is less than a payload of information included in the first indication information in the second format, and the payload of the information included in the first indication information in the second format is less than a payload of information included in the first indication information in the third format.

It should be understood that the quantity of bits, the quantity of pieces of information about the link failure cell, and the payload may each be a maximum value. For example, the quantity of bits occupied by the first indication information in the first format indicates a maximum quantity of bits of the first indication information that can be sent in the format.

The following describes how to determine the format of the first indication information based on the situation of the link failure cell.

Optionally, the situation of the link failure cell may include one or more of the following: a quantity of link failure cells, a payload (payload) of information about the link failure cell, whether a situation of a reference signal used to recover the link failure cell is identified, and so on.

It may be understood that the format of the first indication information may be determined based on one or more of the following: the quantity of link failure cells, the payload of the information about the link failure cell, whether the situation of the reference signal used to recover the link failure cell is identified, or the like.

Optionally, the format of the first indication information may be determined by the terminal device based on the situation of the link failure cell, or may be determined by the network device based on the situation of the link failure cell.

Optionally, the format of the first indication information may be directly determined based on the situation of the link failure cell, or may be indirectly determined based on the situation of the link failure cell.

The following provides descriptions with reference to several possible implementations.

Implementation 1: The terminal device determines the format of the first indication information based on the situation of the link failure cell.

For example, there is a correspondence between a plurality of formats and the situation of the link failure cell. For differentiation, the correspondence is denoted as a first correspondence.

It may be understood that the terminal device may determine the format of the first indication information based on the situation of the link failure cell and with reference to the first correspondence. The first correspondence may be preset, for example, configured by the network device or specified in a protocol, or may be prestored. This is not limited.

A form of the first correspondence may be a correspondence between a plurality of formats and the quantity of link failure cells. The terminal device may use the first indication information in the corresponding format based on the quantity of link failure cells based on the correspondence between the plurality of formats and the quantity of link failure cells.

For example, when the quantity of link failure cells is less than or equal to a preset first threshold, the format of the first indication information may be the first format; or when the quantity of link failure cells is greater than a preset first threshold, the format of the first indication information may be the second format. The preset first threshold may be predefined, for example, predefined by a protocol or by the network device, or may be configured by the network device for the terminal device, or may be an empirical value or the like. This is not limited.

Alternatively, the first correspondence may be in a form of a correspondence between the plurality of formats and the payload of the information about the link failure cell. The terminal device may use the first indication information in the corresponding format based on the payload of the information about the link failure cell based on the correspondence between the plurality of formats and the payload of the information about the link failure cell.

For example, when the payload of the information about the link failure cell is less than or equal to a preset second threshold, the format of the first indication information may be the first format, or when the payload of the information about the link failure cell is greater than a preset second threshold, the format of the first indication information may be the second format. The preset second threshold may be predefined, for example, predefined in a protocol or by the network device, or may be configured by the network device for the terminal device, or may be an empirical value or the like. This is not limited.

Based on the foregoing implementation 1, the terminal device may determine the format of the first indication information based on the situation of the link failure cell.

Implementation 2: The terminal device determines the format of the first indication information based on the resource for carrying the second indication information.

For example, there is a correspondence between a plurality of formats and the resource for carrying the second indication information. For differentiation, the correspondence is denoted as a second correspondence.

Optionally, after determining a cell link failure, the terminal device may send the second indication information to the network device, where the second indication information indicates the cell link failure. For example, the terminal device sends the second indication information to the network device, to notify the network device that a cell link failure occurs.

Optionally, the second indication information may be further used to request a resource for carrying the first indication information.

It should be understood that both the first indication information and the second indication information in this embodiment of this application are information that is used to recover a link failure cell and that is sent by the terminal device to the network device when a link failure occurs in a cell. The first indication information and the second indication information may be collectively referred to as link failure recovery request information. There may be a plurality of manners for the terminal device to send the beam failure recovery request information, and the manners are described in detail below.

For differentiation and without loss of generality, the resource for carrying the first indication information is denoted as a first resource, and the resource for carrying the second indication information is denoted as a second resource. The first resource may be a PUCCH resource, or may be a PUSCH resource. The second resource may be a PUCCH resource, or may be a physical random access channel (physical random access channel, PRACH) resource. This is not limited.

It should be understood that the first resource and the second resource are merely names for distinguishing, and a person skilled in the art should understand meanings of the first resource and the second resource. For example, when the terminal device requests the network device to allocate the first resource, it indicates that the terminal device requests the network device to allocate the resource for carrying the first indication information, and does not mean that the terminal device requests a specific resource. For another example, when the network device allocates the first resource to the terminal device, it indicates that the network device allocates, to the terminal device, a specific resource for carrying the first indication information, and may indicate a specific resource.

The second resource may be not only used for carrying the second indication information, but also used for carrying data, and the like.

The first resource may be not only used for carrying the first indication information, but also used for carrying data or other information. Alternatively, the first resource may be used for carrying only the first indication information. This is not limited.

The terminal device may determine the format of the first indication information based on the resource for carrying the second indication information and with reference to the second correspondence. The second correspondence may be preset, for example, configured by the network device or specified in a protocol, or may be prestored. This is not limited.

For example, two second resources may be configured, which are denoted as a second resource #1 and a second resource #2 respectively. For example, the second resource #1 and the second resource #2 may be distinguished through a cyclic shift (cycle shift), or may be distinguished in another manner (for example, through frequency division, time division, or code division). This is not limited.

The second resource #1 and the second resource #2 are separately associated with or correspond to first indication information in different formats. The terminal device determines the format of the first indication information depending on whether the resource for carrying the second indication information is the second resource #1 or the second resource #2.

There may be a plurality of forms of association or correspondence.

For example, the second resource #1 corresponds to the first indication information in the first format, and the second resource #2 corresponds to the first indication information in the second format. In other words, the format of the first indication information corresponding to the second resource #1 is the first format, and the format of the first indication information corresponding to the second resource #2 is the second format. For another example, the second resource #1 is associated with first indication information with a relatively small payload, and the second resource #2 is associated with first indication information with a relatively large payload. For another example, the second resource #1 is associated with first indication information requesting a relatively small resource (that is, a relatively small first resource), and the second resource #2 is associated with first indication information requesting a relatively large resource (that is, a relatively large first resource). For another example, the second resource #1 corresponds to first indication information carrying information about a maximum of A cells, and the second resource #2 corresponds to first indication information carrying information about a maximum of B cells.

It should be understood that the foregoing lists only several possible association or correspondence forms, and this embodiment of this application is not limited thereto. Any variation of the foregoing forms falls within the protection scope of this embodiment of this application.

A and B are integers greater than or equal to 1, and A is less than B. Specific values of A and B are not limited in this embodiment of this application. A and B may be prespecified by the network device or in a protocol, or may be configured by the network device, or may be calculated by the terminal device. For example, A=[X/log 2(X)], and B=X, where X is a (maximum) quantity of serving cells configured by the network device for the terminal device, or a (maximum) quantity of serving cells that are configured by the network device for the terminal device and in which link failure detection needs to be performed, or a (maximum) quantity of serving cells configured by the network device for a specific terminal device and in which link failure recovery can be performed. For another example, A=1, and B is greater than 1.

For example, when the terminal device uses the second resource #1 to send the second indication information, the format of the first indication information sent by the terminal device is the first format. In other words, the terminal device sends the first indication information in the first format. When the terminal device uses the second resource #2 to send the second indication information, the format of the first indication information sent by the terminal device is the second format. In other words, the terminal device sends the first indication information in the second format. For the first format and the second format, refer to the foregoing descriptions. Details are not described herein again.

The terminal device may determine, based on the situation of the link failure cell, whether to use the second resource #1 to send the second indication information or use the second resource #2 to send the second indication information. It may be understood that the terminal device may determine, based on the situation of the link failure cell and with reference to the foregoing several possible association or correspondence forms, whether to use the second resource #1 to send the second indication information or use the second resource #2 to send the second indication information.

For the situation of the link failure cell, refer to the foregoing descriptions. Details are not described herein again.

For example, when the quantity of link failure cells is less than or equal to a preset first threshold, the terminal device uses the second resource #1 to send the second indication information, or when the quantity of link failure cells is greater than a preset first threshold, the terminal device uses the second resource #2 to send the second indication information. The second indication information is used to notify the network device of a cell link failure, or the second indication information may be used to request a resource for carrying the first indication information.

Figure 15:
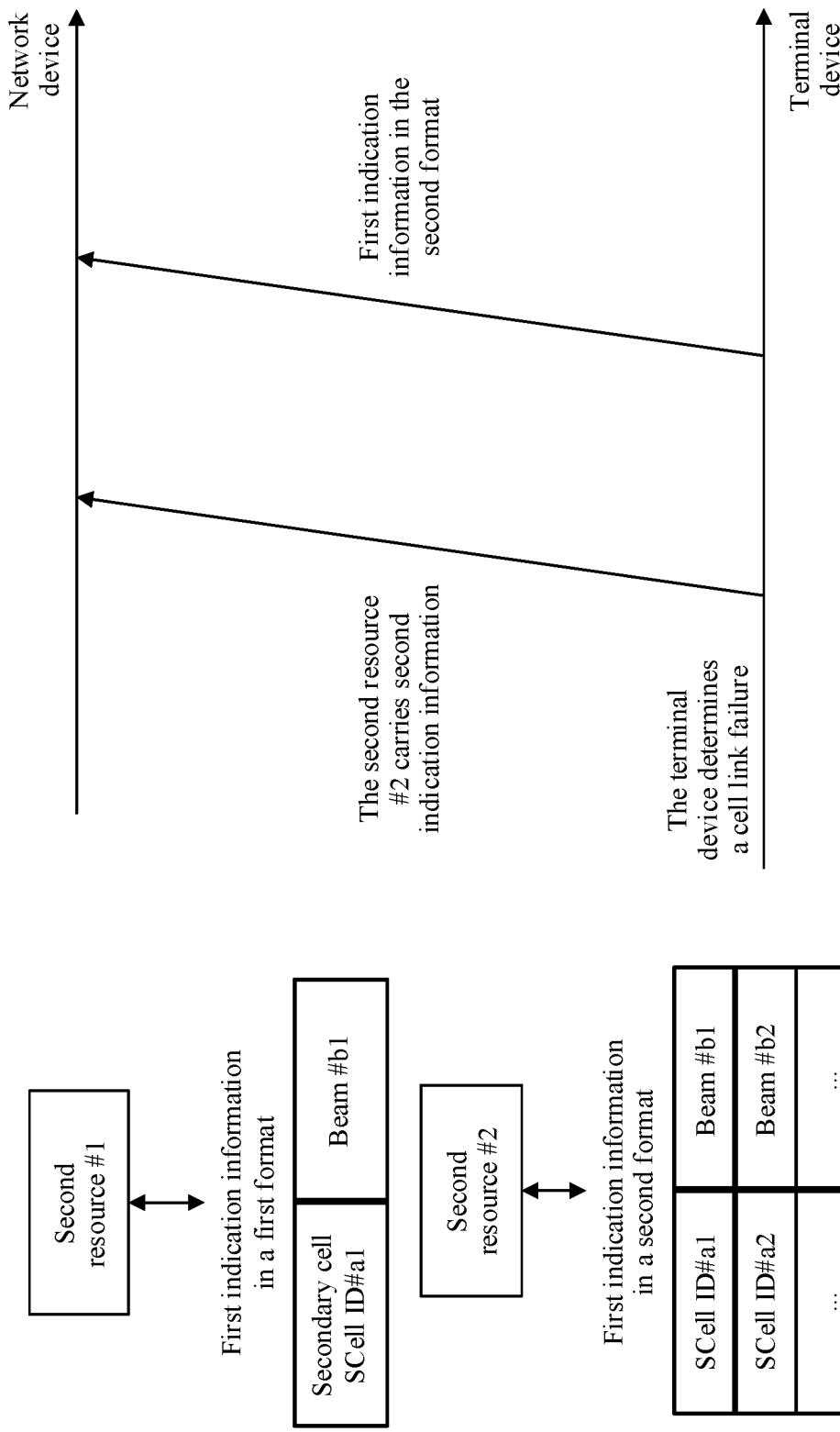
FIG. 15 is a schematic diagram of a second resource and a format of first indication information that are applicable to an embodiment of this application.

FIG. 15 is a schematic diagram of the second resource and the format of the first indication information. It is assumed that the second resource #1 (for example, a PUCCH, which may be denoted as a PUCCH 1) corresponds to the first indication information in the first format, and the second resource #2 (for example, a PUCCH, which may be denoted as a PUCCH 1) corresponds to the first indication information in the second format. The first indication information in the first format may be, for example, a MAC-CE in the first format shown in FIG. 6 to FIG. 11. The first indication information in the second format may be, for example, a MAC-CE in the second format shown in FIG. 12 to FIG. 14. As shown in FIG. 15, the first indication information in the first format may include a serving cell ID field and a second field, for example, denoted as a SCell ID #a and a beam (beam) #b respectively. The first indication information in the second format may include one serving cell ID field, and the serving cell ID field may include one or more Ci fields (that is, a quantity of cells) and one or more corresponding second fields, for example, denoted as a SCell ID #a1 and a beam #b1, a SCell ID #a2 and a beam #b2, and the like.

For example, when determining that a link failure occurs in a cell, the terminal device uses the second resource #1 to send the second indication information, and sends the first indication information in the first format. When determining that link failures occur in five cells, the terminal device uses the second resource #2 to send the second indication information, and sends the first indication information in the second format. FIG. 15 shows only a case in which the terminal device uses the second resource #2 to send the second indication information, and the format of the first indication information is the second format.

For another example, when a payload of information about a link failure cell is less than or equal to a preset second threshold, the terminal device uses the second resource #1 to send the second indication information, or when a payload of information about a link failure cell is greater than a preset second threshold, the terminal device uses the second resource #2 to send the second indication information. The second indication information is used to notify the network device of a cell link failure, or the second indication information may be used to request a resource for carrying the first indication information.

Based on the foregoing implementation 2, the terminal device may determine, based on the situation of the link failure cell, the resource for carrying the second indication information, and then determine the format of the first indication information based on the resource for carrying the second indication information. It may also be understood that the terminal device may indirectly determine the format of the first indication information based on the situation of the link failure cell.

Implementation 3: The terminal device determines the format of the first indication information based on the second indication information.

For example, there is a correspondence between a plurality of formats and the second indication information, or there is a correspondence between a plurality of formats and a plurality of state values of the second indication information, or there is a correspondence between a plurality of formats and different cyclic shifts of a sequence of the second indication information. For distinguishing, the correspondence is denoted as a third correspondence.

It may be understood that the terminal device may determine the format of the first indication information based on the second indication information and with reference to the third correspondence. The third correspondence may be preset, for example, configured by the network device or specified in a protocol, or may be prestored. This is not limited.

For example, the network device configures a third resource, and the terminal device sends the second indication information on the third resource. When the state value of the second indication information is a first value, the format of the first indication information is the first format. When the state value of the second indication information is a second value, the format of the first indication information is the second format.

It should be understood that the third resource is only a name for distinguishing, and does not limit the protection scope of this embodiment of this application.

It should be further understood that the first value is different from the second value, and the first value and the second value are merely names for distinguishing, and do not constitute a limitation on the protection scope of this embodiment of this application.

For another example, the network device configures a third resource, and the terminal device sends the second indication information on the third resource. When a cyclic shift of a sequence carrying the second indication information is a first cyclic shift, the format of the first indication information is the first format; when a cyclic shift of a sequence carrying the second indication information is a second cyclic shift, the format of the first indication information is the second format.

Based on the foregoing implementation 3, the terminal device may determine the format of the first indication information based on content of the second indication information, for example, a cyclic shift or a state value of a sequence of the second indication information.

Implementation 4: The terminal device determines the format of the first indication information based on a size of a resource allocated by the network device.

For example, when the network device allocates a relatively small resource to the terminal device to carry the first indication information, the terminal device sends the first indication information in the first format; when the network device allocates a relatively large resource to the terminal device to carry the first indication information, the terminal device sends the first indication information in the second format.

According to the foregoing descriptions about the first format and the second format, for example, the first format is a short format, and the second format is a long format; a quantity of bits occupied by the first indication information in the first format is less than a quantity of bits occupied by the first indication information in the second format; and a payload of information included in the first indication information in the first format is less than a payload of information included in the first indication information in the second format, it may be understood that a resource required by the first indication information in the first format may be greater than a resource required by the first indication information in the second format. Therefore, in the implementation 4, that the terminal device may determine the format of the first indication information based on a size of a resource allocated by the network device may also be understood as: if the resource can carry the first indication information in the second format, the terminal device determines that the format of the first indication information is the second format, that is, sends the first indication information in the second format; otherwise, if the resource can carry the first indication information in the first format, the terminal device determines that the format of the first indication information is the first format, that is, sends the first indication information in the first format. Alternatively, it may be understood as that when the resource can carry the first indication information in the second format, it is determined that the format of the first indication information is the second format, that is, the first indication information in the second format is sent. When the resource cannot carry the first indication information in the second format, it is determined that the format of the first indication information is the first format, that is, the first indication information in the first format is sent. In other words, when the resource can carry the first indication information in the second format, it is determined that the format of the first indication information is the second format, that is, the first indication information in the second format is sent. If the resource cannot carry the first indication information in the second format but can carry the first indication information in the first format, it is determined that the format of the first indication information is the first format, that is, the first indication information in the first format is sent. For example, according to the foregoing examples, if a relatively large resource is allocated, the terminal device may use the relatively large resource to send the first indication information in the second format; if a relatively small resource is allocated, the terminal device may use the relatively small resource to send the first indication information in the first format.

It should be understood that, in this implementation, the terminal device may send the second indication information, or may not send the second indication information.

The implementation 4 may be used separately, or may be used together with the implementation 1, the implementation 2, or the implementation 3. For example, when the implementation 4 and the implementation 3 are combined, the terminal device may first send the second indication information to the network device, and the network device may allocate a resource of an appropriate size to the terminal device based on a resource for carrying the second indication information or content of the second indication information. Then, the terminal device may determine the format of the first indication information based on the size of the resource allocated by the network device.

That the network device allocates the resource for carrying the first indication information is described with reference to the solution 2.

The foregoing examples describe several implementations of determining the format of the first indication information. The embodiments of this application are not limited thereto. Any manner by using which the terminal device can directly determine the format of the first indication information based on the situation of the link failure cell or indirectly determine the format of the first indication information based on the situation of the link failure cell falls within the scope of the embodiments of this application. For example, the foregoing implementations may be separately used, or may be used in combination.

Based on the foregoing solution 1, the format of the first indication information may be determined based on the situation of the link failure cell, so that a relatively appropriate format can be selected, and a resource waste is reduced. For example, the terminal device may send the first indication information in a corresponding format based on a payload of to-be-transmitted information about a link failure cell. For another example, the terminal device may send the first indication information in a corresponding format based on a quantity of cells in which a link failure occurs. For another example, the terminal device may send the first indication information in a corresponding format based on to-be-transmitted information about a link failure cell and a payload of data. For another example, the terminal device may send the first indication information in a corresponding format based on a size of a resource for carrying the first indication information. For another example, the terminal device may send the first indication information in a corresponding format based on a resource for carrying the second indication information. For another example, the terminal device may send the first indication information in a corresponding format based on the second indication information. For another example, the terminal device sends the first indication information in a corresponding format based on a size of a resource allocated by the network device. For another example, the terminal device may send the first indication information in a corresponding format based on a format configured by the network device.

The foregoing mainly describes the solution 1, including the format of the first indication information and the several implementations of determining the format of the first indication information. The following starts to describe the solution 2.

Solution 2: A resource for carrying the first indication information is determined based on the situation of the link failure cell.

That a resource for carrying the first indication information is determined based on the situation of the link failure cell may also be understood as: a size of the resource for carrying the first indication information is determined based on the situation of the link failure cell.

Optionally, the network device may allocate, to the terminal device based on a resource for carrying the second indication information, the resource for carrying the first indication information. Alternatively, it may be understood that the resource for carrying the first indication information may be indicated or activated based on response information of the second indication information. The response information of the second indication information may also be understood as third indication information.

In a possible implementation, after receiving the second indication information, the network device may send the response information of the second indication information. The response information of the second indication information may indicate a first resource allocated to the terminal device, that is, a resource that is used for carrying the first indication information and that is allocated by the network device to the terminal device. The resource for carrying the first indication information may be an aperiodic resource (or referred to as a dynamic resource).

In this possible implementation, the network device may determine, depending on whether there is a link failure cell (indicated by the second indication information) in a current network, whether to allocate the resource for carrying the first indication information. If the network device receives the second indication information, the network device may learn that in the current network, there is a cell in which a link failure occurs, and the network device may dynamically allocate a resource for carrying the first indication information, so that the terminal device further reports cells in which a link failure occurs, and/or reports information (reference signal information) used to recover a new link in the link failure cell.

As described above, the resource for carrying the second indication information may be determined based on the situation of the link failure cell, and the resource for carrying the first indication information may be determined based on the second indication information. In this case, it may be understood as: the resource (or referred to as a size of the resource) for carrying the first indication information may be indirectly determined based on the situation of the link failure cell. In other words, both the resource for carrying the second indication information and the resource (or referred to as a size of the resource) for carrying the first indication information are determined based on the situation of the link failure cell.

For example, there is a correspondence between the resource for carrying the first indication information and the resource for carrying the second indication information. For distinguishing, the correspondence is denoted as a fourth correspondence.

It may be understood that the network device may allocate, to the terminal device based on the resource for carrying the second indication information and with reference to the fourth correspondence, the resource for carrying the first indication information. The fourth correspondence may be preset, for example, configured by the network device or specified in a protocol, or may be prestored. This is not limited.

The second resource #1 and the second resource #2 are still used as an example for description.

For example, when the terminal device uses the second resource #1 to send the second indication information, the network device allocates a relatively small resource to the terminal device to carry the first indication information; when the terminal device uses the second resource #2 to send the second indication information, the network device allocates a relatively large resource to the terminal device to carry the first indication information.

Because a link failure event is an unexpected event, in this possible implementation, a periodic resource for sending the link failure recovery request information does not need to be reserved in advance, so that resource overheads can be effectively reduced. In addition, because the link failure event is an unexpected event, a quantity of cells in which a link failure occurs is also uncertain. In this possible implementation, the network device can allocate a resource of an appropriate size to carry the first indication information, so that resource overheads can be effectively reduced, and resource utilization is improved.

In still another possible implementation, the response information of the second indication information may be further used to activate the resource for carrying the first indication information.

The network device may pre-allocate, to the terminal device, the resource for carrying the first indication information, and the resource is activated as triggered by the response information of the second indication information. The activated resource for carrying the first indication information may be a semi-persistent (semi-persistent) resource or a periodic (periodic) resource.

For example, the resource for carrying the first indication information may be a semi-persistent resource or a static resource (for example, a PUSCH, a PUCCH, or a PRACH) activated by using the response information of the second indication information or DCI of the second indication information.

In this possible implementation, the network device determines, depending on whether there is a link failure cell in the current network (as indicated by the second indication information), whether to activate the resource for carrying the first indication information. If the network device receives the second indication information, the network device may learn that in the current network, there is a cell in which a link failure occurs, and the network device activates the resource for carrying the first indication information, so that the terminal device further reports cells in which a link failure occurs, and/or reports information (reference signal information) used to recover a new link in a link failure cell.

Optionally, the resource for carrying the first indication information may be configured by using higher layer signaling or system information, or may be a preset resource.

For example, the resource for carrying the first indication information may be configured by the network device for the terminal device, and sent to the terminal device by using higher layer signaling or system information. The resource for carrying the first indication information may alternatively be agreed on by the network device and the terminal device in advance, or may be preset by the terminal device. This is not limited in this application.

Optionally, the resource for carrying the first indication information may alternatively be a resource that has an association relationship with the resource (the second resource) for carrying the second indication information. For differentiation, the association relationship is denoted as a fifth correspondence. The second resource #1 and the second resource #2 are used as an example. For example, the second resource #1 is associated with a relatively small resource for carrying the first indication information. The second resource #2 is associated with a relatively large resource for carrying the first indication information.

It may be understood that, when learning of the resource for carrying the second indication information, the terminal device may determine, with reference to the fifth correspondence, the resource for carrying the first indication information. The fifth correspondence may be preset, for example, configured by the network device or specified in a protocol, or may be prestored. This is not limited.

For example, the association relationship between the resource for carrying the second indication information and the resource for carrying the first indication information may be configured by using system information such as a master information block (master information block, MIB) or a system information block (system information block, SIB), or may be configured by using RRC signaling or MAC-CE signaling. The system information or the signaling may be sent before the second indication information is sent.

For example, the resource for carrying the second indication information and the resource for carrying the first indication information may alternatively be configured by using the foregoing system information or signaling.

Optionally, the network device may configure a plurality of resources for the terminal device to transmit the second indication information, and configure a plurality of resources for the terminal device to transmit the first indication information. The terminal device may select, from the plurality of resources used to transmit the second indication information, one or more resources as the resource for carrying the second indication information, and may further select, from the plurality of resources used to transmit the first indication information, one or more resources as the resource for carrying the first indication information. The plurality of resources used to transmit the second indication information may be configured by using system information such as the MIB or the SIB, or may be configured by using signaling such as RRC or a MAC-CE. The plurality of resources used to transmit the first indication information may also be configured by using system information such as the MIB or the SIB, or may be configured by using signaling such as RRC or a MAC-CE.

Optionally, the resource for carrying the first indication information may alternatively be a resource associated with the resource for carrying the second indication information. Optionally, the network device may configure, by using system information such as a MIB or a SIB, or by using RRC signaling or MAC-CE signaling, a plurality of resources for carrying the second indication information and a plurality of resources for carrying the first indication information, and an association relationship between the plurality of resources for carrying the second indication information and the plurality of resources for carrying the first indication information, and the terminal device may select, from the plurality of resources for carrying the second indication information, one resource as the resource for carrying the second indication information, and may further select, from the plurality of resources for carrying the first indication information, one resource as the resource for carrying the first indication information. Each resource for carrying the second indication information may be associated with one or more resources for carrying the first indication information, and the resources that are used for carrying the first indication information and that are associated with the resource for carrying the second indication information may have different sizes. The terminal device sends the second indication information on a resource for carrying the second indication information, and the terminal device sends the first indication information on a resource that is used for carrying the first indication information and that is associated with the resource for carrying the second indication information.

In this possible implementation, the first indication information may be sent not by using the resource allocated based on the response information of the second indication information, and is directly sent on the resource for carrying the first indication information, so that a link recovery delay can be effectively reduced, and a link recovery speed can be increased.

Based on the foregoing solution 2, the resource for carrying the first indication information may be determined based on the situation of the link failure cell, so that resources can be properly allocated, and a resource waste is reduced.

It should be understood that the foregoing solution 1 and solution 2 may be separately used, or may be used in combination.

Based on the embodiments of this application, the first indication information sent by the terminal device, that is, the first indication information indicating the information about the link failure cell, may be generated based on the situation of the link failure cell. For example, the format of the first indication information to be sent is determined based on the situation of the link failure cell. In other words, an information format of a variable length is designed to indicate the information about the link failure cell, so that the terminal device can adaptively adjust a size or a format of the first indication information sent by the terminal device, thereby effectively reducing reporting of redundant information, and reducing reporting overheads. For another example, the resource for carrying the first indication information is determined based on the situation of the link failure cell, so that the resource for carrying the first indication information can be properly allocated, thereby reducing a resource waste and improving resource utilization.

As described above, both the first indication information and the second indication information in this embodiment of this application are information that is used to recover a link failure cell and that is sent by the terminal device to the network device when a link failure occurs in a cell. The first indication information and the second indication information may be collectively referred to as link failure recovery request information or beam failure recovery request information.

In this embodiment of this application, the beam failure recovery request information may include only the first indication information, or the beam failure recovery request message may include the first indication information and the second indication information. The terminal device may send the beam failure recovery request information in any one of the following manners.

Manner A:

The beam failure recovery request information includes the first indication information. In this manner, the beam failure recovery request information may be reported in only one step.

In a possible implementation, the first indication information indicates an identifier of a link failure cell and/or reference signal information used to recover a link in the link failure cell.

For example, the first indication information may indicate cell identifiers of N cells in which links fail, and/or M pieces of reference signal information used to recover the links in the N cells. M and N both are integers greater than or equal to 1.

It should be understood that in this implementation, the first indication information may include cell identification information of the N cells in which links fail, and/or the M pieces of reference signal information used to recover the links in the N cells.

Optionally, the manner A may be applied to a case in which the first indication information is carried on a PUSCH, for example, a case in which the first indication information is a MAC-CE.

Manner B:

The beam failure recovery request information includes the first indication information and the second indication information. In this manner, the beam failure recovery request information may be reported in two steps.

In a possible implementation, the second indication information indicates a cell link failure. The first indication information indicates: an identifier of a link failure cell, and/or reference signal information used to recover a link in the link failure cell.

For example, the second indication information may indicate a cell link failure. The first indication information may indicate cell identifiers of N cells in which links fail, and/or M pieces of reference signal information used to recover the links in the N cells. M and N are integers greater than or equal to 1.

For example, the second indication information may indicate that a link in at least one of L cells fails, where L is an integer greater than 1. The first indication information indicates cell identifiers of N cells in the L cells, and/or M pieces of reference signal information used to recover links in the N cells. M and N are integers greater than or equal to 1.

It should be understood that in this implementation, the first indication information may include the cell identifiers of the N cells in the L cells, and/or the M pieces of reference signal information used to recover the links in the N cells.

Manner C:

The beam failure recovery request information includes the first indication information and the second indication information. In this manner, the beam failure recovery request information may be reported in two steps.

In a possible implementation, the second indication information indicates an identifier of a link failure cell, and the first indication information indicates reference signal information used to recover a link in the link failure cell.

For example, the second indication information indicates cell identifiers of N cells in which links fail, and the first indication information indicates M pieces of reference signal information used to recover the links in the N cells. M and N are integers greater than or equal to 1.

It should be understood that, in this implementation, the first indication information may include the M pieces of reference signal information used to recover the links in the N cells.

It should be understood that the second indication information in the manner B and the manner C may also be referred to as scheduling request information, or the second indication information and the scheduling request information may use a same format.

Optionally, the resource for carrying the second indication information in the manner B and the manner C may be a PRACH resource, or may be a PUCCH resource.

Optionally, the resource for carrying the first indication information in the manner A, the manner B, and the manner C may be a PUSCH resource, or may be a PUCCH resource.

Optionally, the reference signal resource in the manner A, the manner B, and the manner C may be a CSI-RS resource, or may be an SSB resource.

It should be understood that, in this embodiment of this application, "indicating a cell link failure" may be understood as "indicating that a link failure occurs in at least one cell", or may be understood as "indicating a cell in which a link failure occurs".

It should be further understood that, in this embodiment of this application, "cell identifiers of N cells in which links fail" and/or "M pieces of reference signal information used to recover the links in the N cells in which the links fail" may be collectively referred to as "information about a link failure cell". In other words, the information about the link failure cell includes: an identifier of the link failure cell, and/or reference signal information used to recover a link in the link failure cell.

It should be further understood that a value relationship between N and M is not limited in this embodiment of this application. There may be a plurality of correspondences between the N cells in which links fail and the M pieces of reference signal information that are reported in the link failure recovery request message. For example, one cell corresponds to one piece of reference signal information; one cell corresponds to zero pieces of reference signal information; one cell corresponds to a plurality of pieces of reference signal information; or one piece of reference signal information corresponds to a plurality of cells. This is not limited in this application.

Figure 16:
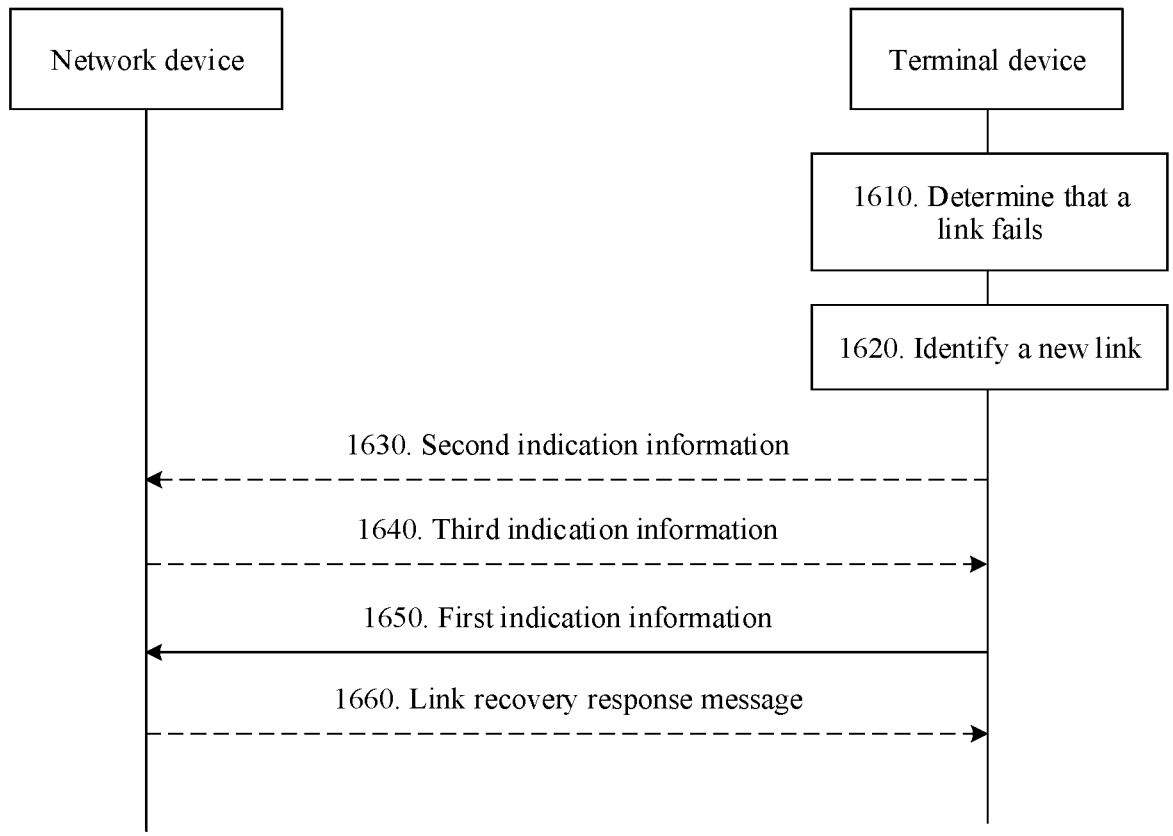
FIG. 16 is another schematic interaction diagram of a communication method according to an embodiment of this application.

FIG. 16 shows a specific example. A method 1600 may include the following steps.

1610. A terminal device determines that a link fails.

In other words, the terminal device determines that a link in at least one cell fails.

For example, the terminal device measures a reference signal resource for beam failure detection, and determines that a link between the terminal device and a network device fails.

Step 1610 is similar to step 510 in the method 500. Details are not described herein again.

1620. The terminal device identifies a new link.

The terminal device measures the reference signal resource, and identifies a reference signal used to recover the link between the terminal device and the network device.

For example, the terminal device determines, based on channel quality information (such as an RSRP, a CQI, a BLER, an SINR, and an SNR) of a candidate reference signal set (candidate beam identification RS), a reference signal (new identified beam) whose channel quality is greater than or equal to a link failure recovery threshold. The determining process herein may be determined by measuring the channel quality information of the candidate reference signal set.

Optionally, the method 1600 may further include step 1630.

1630. The terminal device sends second indication information.

The second indication information may indicate that a cell link fails.

The second indication information may also be referred to as second link failure recovery request information, or may be referred to as scheduling request information. Alternatively, the second indication information and the scheduling request information may use a same format. The second indication information is merely a name, and does not limit the protection scope of this application. A resource for carrying the second indication information may be a PRACH resource, or may be a PUCCH resource.

The second indication information may further indicate a situation of a link failure cell. For example, the second indication information may further indicate one or more of the following: a quantity of link failure cells, a quantity of bits in information about a link failure cell, a payload, and the like. It should be understood that the second indication information may indicate only a rough range of the situation of the link failure cell, but cannot indicate a specific case (that is, the second indication information may indicate only a coarse-grained situation of the link failure cell). For example, the second indication information may indicate that a current quantity of link failure cells is equal to or greater than 1.

In a possible implementation, the network device configures two second resources, for example, a second resource #1 and a second resource #2, which may be used for carrying the second indication information. The terminal device may select the second resource #1 or the second resource #2 based on the situation of the link failure cell, to send the second indication information.

In still another possible implementation, the network device configures a second resource to carry the second indication information. The terminal device may determine the second indication information (for example, determine a value of the second indication information or a sequence to which the second indication information belongs) based on the situation of the link failure cell.

For the second indication information and the resource for carrying the second indication information, refer to the descriptions of the method 500. Details are not described herein again.

It should be understood that the resource for carrying the first indication information may be indicated or activated based on response information of the second indication information.

In a possible implementation, after receiving the second indication information, the network device may send the response information of the second indication information. The response information (for example, denoted as third indication information) of the second indication information may indicate a first resource allocated to the terminal device, that is, a resource that is used for carrying the first indication information and that is allocated by the network device to the terminal device.

In another possible implementation, the response information of the second indication information may be further used to activate the resource for carrying the first indication information. The network device may pre-allocate, to the terminal device, the resource for carrying the first indication information, and the resource is activated as triggered by the response information of the second indication information.

For details, refer to the descriptions of the foregoing method 500. Details are not described herein again.

Optionally, the method 1600 may further include step 1640.

1640. The network device sends the third indication information to the terminal device.

The third indication information indicates the resource for carrying the first indication information. Alternatively, the third indication information may be understood as a response to the second indication information.

For example, the resource for carrying the first indication information may be a resource that is allocated by the network device to the terminal device based on the second indication information. Alternatively, the resource may be understood as a dynamic resource.

For example, the network device may pre-allocate, to the terminal device, the resource for carrying the first indication information, and the resource is activated as triggered by the response information of the second indication information. The activated resource for carrying the first indication information may be a semi-persistent resource or a static resource.

For details, refer to the descriptions of the solution 2 in the foregoing method 500. Details are not described herein again.

1650. The terminal device sends the first indication information.

The first indication information may indicate information about a cell in which a link failure occurs. For example, the first indication information indicates cell IDs of T2 cells in which links fail, and/or T4 pieces of reference signal information for recovering the links in the T2 cells.

For the first indication information, refer to the descriptions of the method 500. Details are not described herein again.

The terminal device may send the first indication information based on the determined format of the first indication information. For example, the terminal device may send the first indication information in a corresponding format based on a payload of to-be-transmitted information about a link failure cell. For another example, the terminal device may send the first indication information in a corresponding format based on a quantity of cells in which a link failure occurs. For another example, the terminal device may send the first indication information in a corresponding format based on the payload of the to-be-transmitted information about the link failure cell and the data. For another example, the terminal device may send the first indication information in a corresponding format based on a size of the resource used for carrying the first indication information. For another example, the terminal device may send the first indication information in a corresponding format based on a format configured by the network device.

For the format of the first indication information, refer to the descriptions of the method 500. Details are not described herein again.

The resource used by the terminal device to send the first indication information may be determined based on the second indication information or based on a resource for carrying the second indication information. For the resource for carrying the first indication information, refer to the descriptions of the method 500. Details are not described herein again.

Alternatively, the terminal device may send the first indication information on a PUSCH resource.

Step 1650 is similar to step 520 in the method 500. Details are not described herein again.

Optionally, the method 1600 may further include step 1660.

1660. The network device sends a link recovery response message to the terminal device.

It should be understood that, for information in the method 1600, such as the first indication information and the second indication information, refer to the descriptions of the method 500. Details are not described herein again.

It should be further understood that, in this embodiment of this application, the "first indication information" may be replaced with a "MAC-CE".

It should be further understood that in the embodiments of this application, the "cell" may be understood as a "serving cell" or a "carrier".

Optionally, the cell includes at least one of a downlink carrier, an uplink (uplink, UL) carrier, and a supplementary uplink (supplementary uplink, SUL) carrier. Specifically, the cell may include a downlink carrier and an uplink carrier; the cell may include a downlink carrier and a supplementary uplink carrier; or the cell includes a downlink carrier, an uplink carrier, and a supplementary uplink carrier.

Optionally, a carrier frequency of the supplementary uplink carrier is lower than that of the uplink carrier, so as to improve uplink coverage.

Optionally, generally, in an FDD system, a carrier frequency of the uplink carrier is different from that of the downlink carrier. In a TDD system, a carrier frequency of the uplink carrier is the same as that of the downlink carrier.

It should be further understood that, in this embodiment of this application, an uplink resource is on the uplink carrier, and a downlink resource is on the downlink carrier.

It should be further understood that, in this embodiment of this application, the uplink carrier may be a normal uplink carrier, or may be a supplementary uplink (supplementary uplink, SUL) carrier.

It should be further understood that "detection" in this embodiment of this application may be understood as "receiving", or may be understood as "decoding".

It should be further understood that in the embodiments of this application, the time unit may be one or more radio frames, one or more subframes, one or more slots, one or more mini slots (mini slot), one or more orthogonal frequency division multiplexing (orthogonal frequency division multiplexing, OFDM) symbols, or the like defined in an LTE system or a 5G NR system, or may be a time window including a plurality of frames or subframes, for example, a system information (system information, SI) window.

It should be further understood that, in this embodiment of this application, the "cell identifier" may alternatively be replaced with a "cell index".

It should be further understood that, in the embodiments of this application, "when . . . " does not definitely mean occurrence at the same time. Unless otherwise specified, "when . . . " means "in a case in which . . . ". For example, "when a B field is 1" indicates "in a case in which the B field is 1". For another example, that both the first indication information and the second indication information are information that is sent by the terminal device to the network device and that is used to recover a link failure cell when a link failure occurs in a cell indicates that both the first indication information and the second indication information are information that is sent by the terminal device to the network device and that is used to recover the link failure cell in a case in which a link failure occurs in a cell, but is not the information that is sent by the terminal device to the network device and that is used to recover the link failure cell at the same time when a link failure occurs in the cell.

It should be further understood that, in this embodiment of this application, "the second resource and the third resource may be resources in a primary cell or a secondary cell, or may be resources that are configured by the network device for the terminal device and that are dedicated to recovering a link failure cell (or may be resources that are configured by the network device for the terminal device and that are dedicated to recovering a secondary cell in which a link fails). It depends on the network device to schedule or indicate a cell to which the "first resource" belongs. The first resource, the second resource, and the third resource may be resources of a same cell or resources of different cells. The "first indication information" and the "second indication information" may be indication information used to recover a failed link in a secondary cell and/or a special cell.

Based on the foregoing technical solutions, the first indication information sent by the terminal device, that is, the first indication information indicating the information about the link failure cell, may be generated based on the situation of the link failure cell. For example, the format of the first indication information to be sent is determined based on the situation of the link failure cell. In other words, an information format of a variable length is designed to indicate the information about the link failure cell, so that the terminal device can adaptively adjust a size or a format of the first indication information sent by the terminal device, thereby effectively reducing reporting of redundant information, and reducing reporting overheads. For another example, the resource for carrying the first indication information is determined based on the situation of the link failure cell, so that the resource for carrying the first indication information can be properly allocated, thereby reducing a resource waste and improving resource utilization.

The embodiments described in this specification may be independent solutions, or may be combined based on internal logic. All these solutions fall within the protection scope of this application.

It may be understood that in the foregoing method embodiments, a method implemented by the terminal device may alternatively be implemented by a component (for example, a chip or a circuit) that may be used in the terminal, and a method implemented by the network device may alternatively be implemented by a component (for example, a chip or a circuit) that may be used in the network device.

The methods provided in the embodiments of this application are described above in detail with reference to FIG. 5 to FIG. 16. The following describes in detail communications apparatuses provided in the embodiments of this application with reference to FIG. 17 to FIG. 20. It should be understood that descriptions of apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing function, each network element, such as a transmit end device or a receive end device, includes a corresponding hardware structure and/or software module for performing each function. A person skilled in the art may be aware that units and algorithm steps in the examples described with reference to the embodiments disclosed in this specification can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software function module. It should be noted that, in the embodiments of this application, division into the modules is an example, and is merely logical function division. In an actual implementation, another division manner may be used. An example in which function modules are obtained through division based on functions is used below for description.

Figure 17:
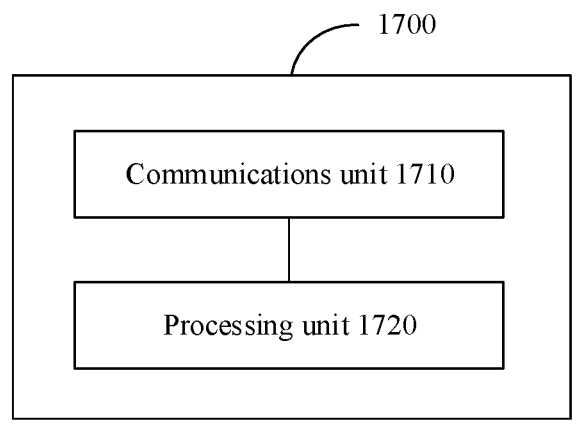
FIG. 17 is a schematic block diagram of a communications apparatus according to an embodiment of this application.

FIG. 17 is a schematic block diagram of a communications apparatus according to an embodiment of this application. As shown in FIG. 7, the communications apparatus 1700 may include a communications unit 1710 and a processing unit 1720. The communications unit 1710 may communicate with the outside, and the processing unit 1720 is configured to perform data processing. The communications unit 1710 may also be referred to as a communications interface or a transceiver unit. The communications interface is configured to input and/or output information, and the information includes at least one of an instruction and data. Optionally, the communications apparatus may be a chip or a chip system. When the communications apparatus is the chip or the chip system, the communications interface may be an input/output interface, or may be an input/output interface, an interface circuit, an output circuit, an input circuit, a pin, a related circuit, or the like on the chip or the chip system. The processor may alternatively be reflected as a processing circuit or a logic circuit.

In a possible design, the communications apparatus 1700 may implement a step or a procedure performed by the terminal device in the foregoing method embodiments, and may be, for example, the terminal device, or a chip, a circuit, or a chip system configured in the terminal device. In this case, the communications apparatus 1700 may be referred to as the terminal device. The communications unit 1710 is configured to perform receiving/sending-related operations on the terminal device side in the foregoing method embodiments, and the processing unit 1720 is configured to perform processing-related operations on the terminal device in the foregoing method embodiments.

In a possible implementation, the processing unit 1720 is configured to determine that a link in at least one cell fails. The communications unit 1710 is configured to send first indication information, where the first indication information indicates information about a link failure cell, and the first indication information is determined based on a situation of the link failure cell.

Optionally, before sending the first indication information, the communications unit 1710 is further configured to send second indication information on a corresponding second resource based on the situation of the link failure cell, where the second indication information indicates a cell link failure.

Optionally, the second indication information is used to request a first resource for carrying the first indication information.

Optionally, the communications unit 1710 is specifically configured to send second indication information on a third resource, where the second indication information is used to request a first resource for carrying the first indication information.

Optionally, the communications unit 1710 is further configured to receive third indication information, where the third indication information indicates the first resource for carrying the first indication information.

Optionally, the first resource carries the first indication information in a corresponding format.

Optionally, that the first indication information is determined based on a situation of the link failure cell includes: a format of the first indication information is determined based on the situation of the link failure cell; and/or a resource for carrying the first indication information is determined based on the situation of the link failure cell.

Optionally, the format of the first indication information is the first format or the second format, where the first format and the second format meet one or more of the following: a quantity of bits occupied by the first indication information in the first format is less than a quantity of bits occupied by the first indication information in the second format; the first indication information in the first format indicates information about N1 link failure cells, and the first indication information in the second format indicates information about N2 link failure cells, where N1 and N2 are integers greater than or equal to 1, and N1<N2; or a payload of information included in the first indication information in the first format is less than a payload of information included in the first indication information in the second format.

Optionally, the format of the first indication information is the first format, and the first indication information in the first format includes one or more of the following information: a serving cell identifier field, a first field, or a second field, where the serving cell identifier field indicates an identifier of the link failure cell by using a state value, the first field indicates whether the link failure cell indicated by the serving cell identifier field has a corresponding second field, and the second field indicates reference signal information used to recover a link in the link failure cell indicated by the serving cell identifier field.

Optionally, the format of the first indication information is the second format, and the first indication information in the second format includes one or more of the following information: a serving cell identifier field, a first field, or a second field, where the serving cell identifier field indicates an identifier of the link failure cell by using a bitmap, the first field indicates whether the link failure cell indicated by the serving cell identifier field has a corresponding second field, and the second field indicates reference signal information used to recover a link in the link failure cell indicated by the serving cell identifier field.

Optionally, if the situation of the link failure cell satisfies a preset condition, the first indication information indicates an identifier of the link failure cell by using a state value; and/or if the situation of the link failure cell does not meet the preset condition, the first indication information indicates the identifier of the link failure cell by using a bitmap.

Optionally, the preset condition includes: a quantity of link failure cells is less than or equal to a preset first threshold, or a valid payload of the information about the link failure cell is less than or equal to a preset second threshold.

Optionally, the situation of the link failure cell includes: a quantity of link failure cells and/or a valid payload of the information about the link failure cell.

In another possible implementation, the processing unit 1720 is configured to determine that a link in at least one cell fails. The processing unit 1720 is further configured to determine a format of first indication information based on a situation of a link failure cell, where the first indication information indicates information about the link failure cell. The communications unit 1710 is configured to send the first indication information.

Optionally, the first resource carries the first indication information in a corresponding format.

Optionally, the format of the first indication information is the first format or the second format, where the first format and the second format meet one or more of the following: a quantity of bits occupied by the first indication information in the first format is less than a quantity of bits occupied by the first indication information in the second format; the first indication information in the first format indicates information about N1 link failure cells, and the first indication information in the second format indicates information about N2 link failure cells, where N1 and N2 are integers greater than or equal to 1, and N1<N2; or a payload of information included in the first indication information in the first format is less than a payload of information included in the first indication information in the second format.

Optionally, the format of the first indication information is the first format, and the first indication information in the first format includes one or more of the following information: a serving cell identifier field, a first field, or a second field, where the serving cell identifier field indicates an identifier of the link failure cell by using a state value, the first field indicates whether the link failure cell indicated by the serving cell identifier field has a corresponding second field, and the second field indicates reference signal information used to recover a link in the link failure cell indicated by the serving cell identifier field.

Optionally, the format of the first indication information is the second format, and the first indication information in the second format includes one or more of the following information: a serving cell identifier field, a first field, or a second field, where the serving cell identifier field indicates an identifier of the link failure cell by using a bitmap, the first field indicates whether the link failure cell indicated by the serving cell identifier field has a corresponding second field, and the second field indicates reference signal information used to recover a link in the link failure cell indicated by the serving cell identifier field.

Optionally, if the situation of the link failure cell satisfies a preset condition, the first indication information indicates an identifier of the link failure cell by using a state value; and/or if the situation of the link failure cell does not meet the preset condition, the first indication information indicates the identifier of the link failure cell by using a bitmap.

Optionally, the preset condition includes: a quantity of link failure cells is less than or equal to a preset first threshold, or a valid payload of the information about the link failure cell is less than or equal to a preset second threshold.

Optionally, the situation of the link failure cell includes: a quantity of link failure cells and/or a valid payload of the information about the link failure cell.

The communications apparatus 1700 may implement the method 500 and the steps or procedures performed by the terminal device in the method 1600 according to the embodiments of this application. The communications apparatus 1700 may include units configured to perform the method 500 in FIG. 5 and perform the method performed by the terminal device in the method 1600 in FIG. 16. In addition, the units in the communications apparatus 1700 and the foregoing other operations and/or functions are separately intended to implement corresponding procedures of the method 500 in FIG. 5 and the method 1600 in FIG. 16.

When the communications apparatus 1700 is configured to perform the method 500 in FIG. 5, the communications unit 1710 may be configured to perform step 520 in the method 500, and the processing unit 1720 may be configured to perform step 510 in the method 500.

When the communications apparatus 1700 is configured to perform the method 1600 in FIG. 16, the communications unit 1710 may be configured to perform step 1630, step 1640, step 1650, and step 1660 in the method 1600, and the processing unit 1720 may be configured to perform step 1610 and step 1620 in the method 1600.

It should be understood that a specific process in which each unit performs the foregoing corresponding steps is described in detail in the foregoing method embodiments. For brevity, details are not described herein again.

Figure 19:
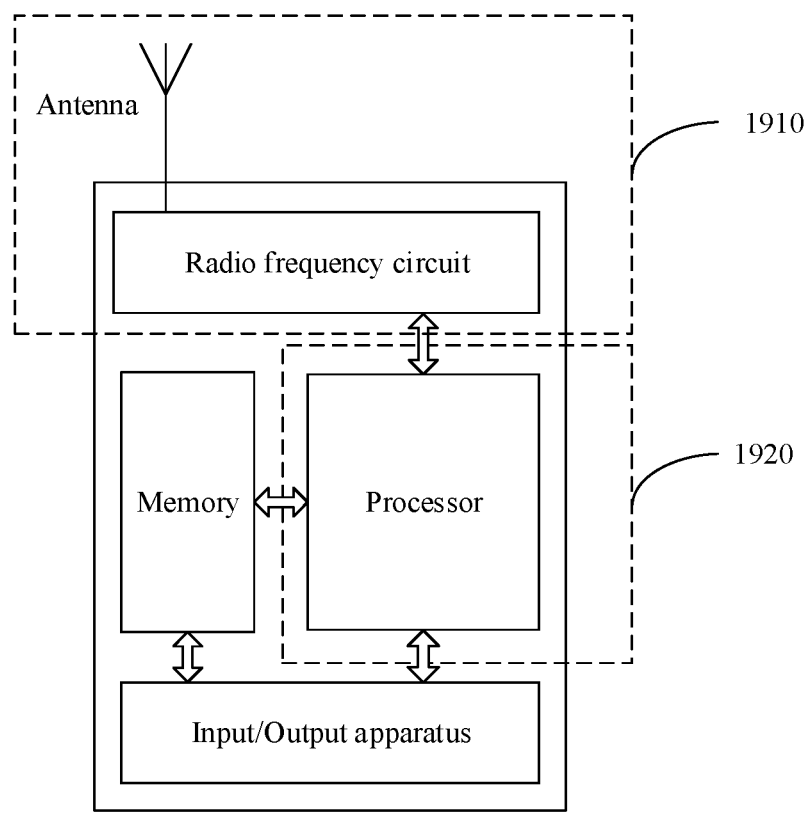
FIG. 19 is a schematic block diagram of a terminal device according to an embodiment of this application.

It should be further understood that the communications unit 1710 in the communications apparatus 1700 may be implemented by a transceiver 1910 in a terminal device 1900 shown in FIG. 19, and the processing unit 1720 in the communications apparatus 1700 may be implemented by a processor 1920 in a terminal device 1900 shown in FIG. 19. The transceiver may include a transmitter and/or a receiver, to respectively implement functions of a sending unit and a receiving unit.

It should be further understood that the communications unit 1710 in the communications apparatus 1700 may alternatively be an input/output interface.

In another possible design, the communications apparatus 1700 may implement the steps or procedures performed by the network device in the foregoing method embodiments, and may be, for example, the network device, or a chip, a circuit, or a chip system configured in the network device. In this case, the communications apparatus 1700 may be referred to as a network device. The communications unit 1710 is configured to perform receiving/sending-related operations on the network device side in the foregoing method embodiments, and the processing unit 1720 is configured to perform processing-related operations on the network device in the foregoing method embodiments.

In a possible implementation, the communications unit 1710 is configured to receive first indication information, where the first indication information indicates information about a link failure cell, and the first indication information or a format of the first indication information is determined based on a situation of the link failure cell. The processing unit 1720 is configured to recover a link in the link failure cell based on the first indication information.

Optionally, before receiving the first indication information, the communications unit 1710 is configured to receive second indication information, where the second indication information or a second resource for carrying the second indication information is determined based on the situation of the link failure cell, and the second indication information indicates a cell link failure. The processing unit 1720 is configured to determine, based on the second indication information or the second resource for carrying the second indication information, a first resource for carrying the first indication information.

Optionally, the communications unit 1710 is further configured to send third indication information, where the third indication information indicates the first resource for carrying the first indication information.

Optionally, the first resource carries the first indication information in a corresponding format.

Optionally, that the first indication information is determined based on a situation of the link failure cell includes: a format of the first indication information is determined based on the situation of the link failure cell; and/or a resource for carrying the first indication information is determined based on the situation of the link failure cell.

Optionally, the format of the first indication information is the first format or the second format, where the first format and the second format meet one or more of the following: a quantity of bits occupied by the first indication information in the first format is less than a quantity of bits occupied by the first indication information in the second format; the first indication information in the first format indicates information about N1 link failure cells, and the first indication information in the second format indicates information about N2 link failure cells, where N1 and N2 are integers greater than or equal to 1, and N1<N2; or a payload of information included in the first indication information in the first format is less than a payload of information included in the first indication information in the second format.

Optionally, the format of the first indication information is the first format, and the first indication information in the first format includes one or more of the following information: a serving cell identifier field, a first field, or a second field, where the serving cell identifier field indicates an identifier of the link failure cell by using a state value, the first field indicates whether the link failure cell indicated by the serving cell identifier field has a corresponding second field, and the second field indicates reference signal information used to recover a link in the link failure cell indicated by the serving cell identifier field.

Optionally, the format of the first indication information is the second format, and the first indication information in the second format includes one or more of the following information: a serving cell identifier field, a first field, or a second field, where the serving cell identifier field indicates an identifier of the link failure cell by using a bitmap, the first field indicates whether the link failure cell indicated by the serving cell identifier field has a corresponding second field, and the second field indicates reference signal information used to recover a link in the link failure cell indicated by the serving cell identifier field.

Optionally, if the situation of the link failure cell satisfies a preset condition, the first indication information indicates an identifier of the link failure cell by using a state value; and/or if the situation of the link failure cell does not meet the preset condition, the first indication information indicates the identifier of the link failure cell by using a bitmap.

Optionally, the preset condition includes: a quantity of link failure cells is less than or equal to a preset first threshold, or a valid payload of the information about the link failure cell is less than or equal to a preset second threshold.

Optionally, the situation of the link failure cell includes: a quantity of link failure cells and/or a valid payload of the information about the link failure cell.

The communications apparatus 1700 may implement the method 500 and the steps or procedures performed by the network device in the method 1600 according to the embodiments of this application. The communications apparatus 1700 may include units configured to perform the method 500 in FIG. 5 and perform the method performed by the network device in the method 1600 in FIG. 16. In addition, the units in the communications apparatus 1700 and the foregoing other operations and/or functions are separately intended to implement corresponding procedures of the method 500 in FIG. 5 and the method 1600 in FIG. 16.

When the communications apparatus 1700 is configured to perform the method 500 in FIG. 5, the communications unit 1710 may be configured to perform step 520 in the method 500, and the processing unit 1720 may be configured to perform step 530 in the method 500.

When the communications apparatus 1700 is configured to perform the method 1600 in FIG. 16, the communications unit 1710 may be configured to perform step 1630, step 1640, step 1650, and step 1660 in the method 1600.

It should be understood that a specific process in which each unit performs the foregoing corresponding steps is described in detail in the foregoing method embodiments. For brevity, details are not described herein again.

Figure 20:
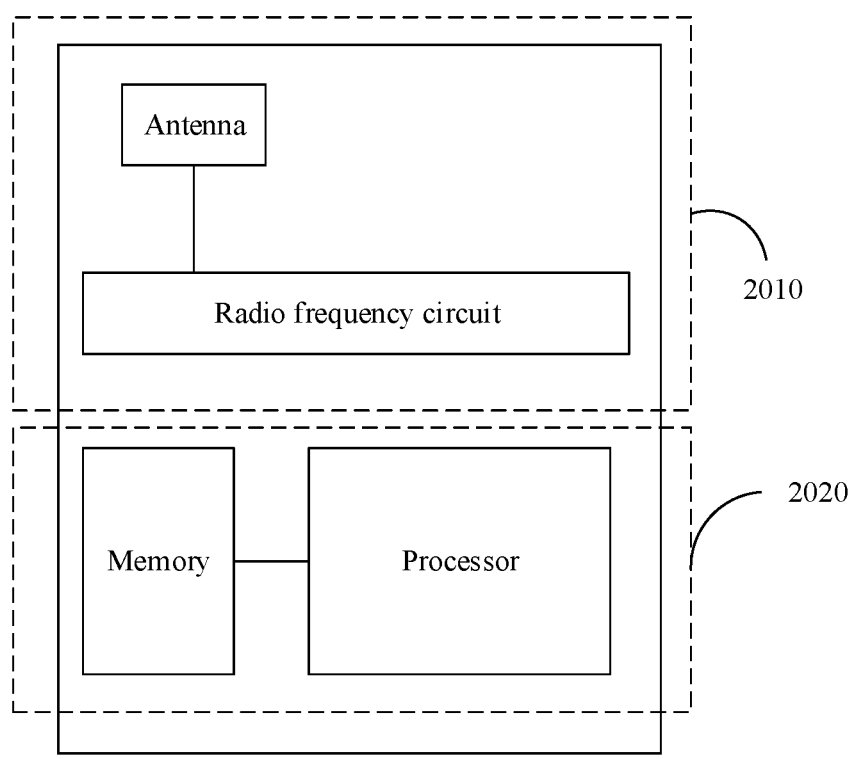
FIG. 20 is a schematic block diagram of a network device according to an embodiment of this application.

It should be further understood that the communications unit in the communications apparatus 1700 may be implemented by a transceiver 2010 in a network device 1900 shown in FIG. 20, and the processing unit 1720 in the communications apparatus 1700 may be implemented by a processor 2020 in a network device 1900 shown in FIG. 20.

It should be further understood that the communications unit 1710 in the communications apparatus 1700 may alternatively be an input/output interface. The transceiver may include a transmitter and/or a receiver, to respectively implement functions of a sending unit and a receiving unit.

Figure 18:
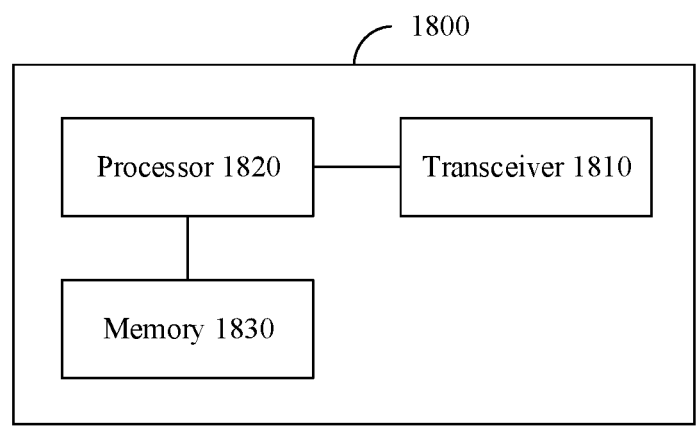
FIG. 18 is another schematic block diagram of a communications apparatus according to an embodiment of this application.

FIG. 18 is another schematic block diagram of a communications apparatus 1800 according to an embodiment of this application. As shown in the figure, the communications apparatus 1800 includes a transceiver 1810, a processor 1820, and a memory 1830. The memory 1830 stores a program, and the processor 1820 is configured to execute the program stored in the memory 1830. Execution of the program stored in the memory 1830 enables the processor 1820 to perform related processing steps in the foregoing method embodiments, and enables the processor 1820 to control the transceiver 1810 to perform related receiving/sending steps in the foregoing method embodiments.

In an implementation, the communications apparatus 1800 is configured to perform an action performed by the terminal device in the foregoing method embodiments. In this case, the execution of the program stored in the memory 1830 enables the processor 1820 to perform processing steps on the terminal device side in the foregoing method embodiments, and enables the processor 1820 to control the transceiver 1810 to perform receiving/sending steps on the terminal device side in the foregoing method embodiments.

In another implementation, the communications apparatus 1800 is configured to perform an action performed by the network device in the foregoing method embodiments. In this case, the execution of the program stored in the memory 1830 enables the processor 1820 to perform processing steps on the network device side in the foregoing method embodiments, and enables the processor 1820 to control the transceiver 1810 to perform receiving/sending steps on the network device side in the foregoing method embodiments.

An embodiment of this application further provides a communications apparatus 1900. The communications apparatus 1900 may be a terminal device or a chip. The communications apparatus 1900 may be configured to perform an action performed by the terminal device in the foregoing method embodiments.

When the communications apparatus 1900 is a terminal device, FIG. 19 is a simplified schematic structural diagram of the terminal device. For ease of understanding and figure illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to: receive data entered by a user, and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 19 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 19, the terminal device includes a transceiver unit 1910 and a processing unit 1920. The transceiver unit 1910 may also be referred to as a transceiver, a transceiver machine, a transceiver apparatus, or the like. The processing unit 1920 may also be referred to as a processor, a processing board, a processing module, a processing apparatus, or the like. Optionally, a component that is in the transceiver unit 1910 and that is configured to implement a receiving function may be considered as a receiving unit, and a component that is in the transceiver unit 1910 and that is configured to implement a sending function may be considered as a sending unit. In other words, the transceiver unit 1910 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 1920 is configured to perform step 510 in FIG. 5 and step 1610 and step 1620 in FIG. 16, and/or the processing unit 1920 is further configured to perform another processing step on the terminal device side in this embodiment of this application. The transceiver unit 1910 is further configured to perform step 520 shown in FIG. 5, and step 1630, step 1640, step 1650, and step 1660 in FIG. 16, and/or the transceiver unit 1910 is further configured to perform another receiving/sending step on the terminal device side.

It should be understood that FIG. 19 is merely an example instead of a limitation. The terminal device including the transceiver unit and the processing unit may not depend on the structure shown in FIG. 19.

When the communications device 1900 is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a communications apparatus 1900. The communications apparatus 1900 may be a network device or a chip. The communications apparatus 1900 may be configured to perform an action performed by the network device in the foregoing method embodiments.

When the communications apparatus 1900 is a network device, for example, a base station, FIG. 20 is a simplified schematic structural diagram of the base station. The base station includes a part 2010 and a part 2020. The part 2010 is mainly configured to: receive and send a radio frequency signal, and perform conversion between a radio frequency signal and a baseband signal. The part 2020 is mainly configured to: perform baseband processing, control the base station, and the like. The part 2010 may be usually referred to as a transceiver unit, a transceiver machine, a transceiver circuit, a transceiver, or the like. The part 2020 is usually a control center of the base station, and may usually be referred to as a processing unit, and is configured to control the base station to perform a processing operation on a network device side in the foregoing method embodiments.

The transceiver unit in the part 2010 may also be referred to as a transceiver machine, a transceiver, or the like. The transceiver unit includes an antenna and a radio frequency unit. The radio frequency unit is mainly configured to perform radio frequency processing. Optionally, a component, in the part 2010, that is configured to implement a receiving function may be considered as a receiving unit, and a component that is configured to implement a sending function may be considered as a sending unit. In other words, the part 2010 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 2020 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, a plurality of boards may share one or more processors, or a plurality of boards share one or more memories, or a plurality of boards simultaneously share one or more processors.

For example, in an implementation, the transceiver unit in part 2010 is configured to perform step 510 in FIG. 5 and step 1610 and step 1620 in FIG. 16, and/or the transceiver unit in part 2010 is further configured to perform another receiving/sending step on a network device side in this embodiment of this application. The processing unit in the part 2020 is configured to perform step 530 in FIG. 5, and/or the processing unit in the part 2020 is further configured to perform a processing step on the network device side in the embodiments of this application.

It should be understood that FIG. 20 is merely an example instead of a limitation. The network device including the transceiver unit and the processing unit may not depend on the structure shown in FIG. 20.

When the communications apparatus 1900 is a chip, the chip includes a transceiver unit and a processing unit. The transceiver unit may be an input/output circuit or a communications interface. The processing unit is a processor, a microprocessor, or an integrated circuit integrated on the chip.

In addition, the network device is not limited to the foregoing forms, and may also be in another form. For example, the network device includes an AAU, or may further include a CU node and/or a DU node, or may include a BBU and an adaptive radio unit (adaptive radio unit, ARU), or a BBU and an AAU, or may be customer premises equipment (customer premises equipment, CPE), or may be in another form. This is not limited in this application.

The CU and/or the DU may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions of the foregoing method embodiments. Details are not described herein again.

An embodiment of this application further provides a processing apparatus, including a processor and an interface. The processor may be configured to perform the methods described in the method embodiments.

It should be understood that the processing apparatus may be a chip. For example, the processing apparatus may be a field programmable gate array (field programmable gate array, FPGA), an application-specific integrated chip (application specific integrated circuit, ASIC), a system on chip (system on chip, SoC), a central processing unit (central processor unit, CPU), a network processor (network processor, NP), a digital signal processing circuit (digital signal processor, DSP), a microcontroller (micro controller unit, MCU), a programmable controller (programmable logic device, PLD), or another integrated chip.

In an implementation process, the steps of the foregoing methods can be implemented by using a hardware integrated logic circuit in the processor or by using an instruction in a form of software. The steps of the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor, or the like. Steps of the methods disclosed with reference to the embodiments of this application may be directly executed and accomplished by using a hardware decoding processor, or may be executed and accomplished by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Examples but not limitative description is provided herein. Many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these types of memories and any memory of another appropriate type.

According to the methods provided in the embodiments of this application, this application further provides a computer program product. The computer program product includes computer program code. When the computer program code is run on a computer, the computer is enabled to perform the method in any one of the embodiments shown in FIG. 5 to FIG. 16.

According to the methods provided in the embodiments of this application, this application further provides a computer-readable medium. The computer-readable medium stores program code. When the program code is run on a computer, the computer is enabled to perform the method in any one of the embodiments shown in FIG. 5 to FIG. 16.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments correspond to the network device and the terminal device in the method embodiments. A corresponding module or unit performs a corresponding step. For example, a communications unit (a transceiver) performs a receiving step or a sending step in the method embodiments, and another step other than the sending step and the receiving step may be performed by a processing unit (a processor). For a function of a specific unit, refer to the corresponding method embodiments. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions describe merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, based on performing beam failure detection, a link failure in at least one cell; and
   sending indication information, wherein the indication information indicates information about the at least one cell having the link failure, wherein a format of the indication information is determined based on a situation of the at least one cell having the link failure, wherein the format of the indication information is a first format or a second format, wherein a quantity of bits occupied by the indication information in the first format is less than a quantity of bits occupied by the indication information in the second format, and wherein the indication information in the first format indicates information about N1 cells having the link failure, and the indication information in the second format indicates information about N2 cells having the link failure, wherein N1 and N2 are integers greater than or equal to 1, and N1<N2.

2. The communication method according to claim 1, wherein the situation comprises at least one of: a quantity of serving cells configured with link failure detection or a size of a resource allocated to send the indication information.

3. The communication method according to claim 2, wherein the serving cells are configured by a network device and the size of the resource is allocated by the network device.

4. The communication method according to claim 1, wherein the first format and the second format satisfy one or more of the following:
   a maximum quantity of bits available to be occupied by the indication information in the first format is less than a maximum quantity of bits available to be occupied by the indication information in the second format;
   the indication information in the first format indicates the information about a maximum number of the N1 cells having the link failure, and the indication information in the second format indicates the information about a maximum number of the N2 cells having the link failure; or
   a maximum available payload of the information comprised in the indication information in the first format is less than a maximum available payload of the information comprised in the indication information in the second format.

5. The communication method according to claim 1, wherein the format of the indication information is the first format, and wherein the indication information in the first format comprises one or more of:
   a first field or a second field, wherein
   the first field indicates whether a second field corresponding to the at least one cell having the link failure exists, and
   the second field indicates reference signal information used to recover a link in a cell having the link failure.

6. The communication method according to claim 1, wherein the format of the indication information is the second format, and the indication information in the second format comprises one or more of the following information:
   a serving cell identifier field, a first field, or a second field, wherein
   the serving cell identifier field indicates an identifier of the at least one cell having the link failure by using a bitmap,
   the first field indicates whether the second field corresponding to the at least one cell having the link failure exists, and
   the second field indicates reference signal information used to recover a link in a cell having the link failure.

7. The communication method according to claim 1, wherein the indication information in the second format comprises X Ci fields, b first fields, and m second fields, wherein b of the X Ci fields correspond to the b first fields and have a value of 1, and wherein m of the b first fields correspond to the m second fields and have a value of 1.

8. The communication method according to claim 1, wherein the indication information indicates an identifier of the at least one cell having the link failure by using a state value or a bitmap.

9. The communication method according to claim 1, wherein the situation of the at least one cell having the link failure comprises one or more of: a quantity of cells having the link failure or a valid payload of the information about the at least one cell having the link failure.

10. A communications apparatus, comprising:
    at least one processor, and one or more memories coupled to the at least one processor and storing programming instructions for execution by the at least one processor to perform operations comprising:
    determining, based on performing beam failure detection, a link failure in at least one cell; and
    sending indication information, wherein the indication information indicates information about at least one cell having the link failure, wherein a format of the indication information is determined based on a situation of the at least one cell having the link failure, wherein the format of the indication information is a first format or a second format, wherein a quantity of bits occupied by the indication information in the first format is less than a quantity of bits occupied by the indication information in the second format, and wherein the indication information in the first format indicates information about N1 cells having the link failure, and the indication information in the second format indicates information about N2 cells having the link failure, wherein N1 and N2 are integers greater than or equal to 1, and N1<N2.

11. The apparatus according to claim 10, wherein the situation comprises at least one of: a quantity of serving cells configured with link failure detection or a size of a resource allocated to send the indication information.

12. The apparatus according to claim 11, wherein
    the serving cells are configured by a network device and the size of the resource is allocated by the network device.

13. The apparatus according to claim 10, wherein the first format and the second format satisfy one or more of the following:
    a maximum quantity of bits available to be occupied by the indication information in the first format is less than a maximum quantity of bits available to be occupied by the indication information in the second format;
    the indication information in the first format indicates the information about a maximum number of the N1 cells having the link failure, and the indication information in the second format indicates the information about a maximum number of the N2 cells having the link failure; or a maximum available payload of the information comprised in the indication information in the first format is less than a maximum available payload of the information comprised in the indication information in the second format.

14. The apparatus according to claim 10, wherein the format of the indication information is the first format, and the indication information in the first format comprises one or more of the following information:
a first field or a second field, wherein
the first field indicates whether a second field corresponding to the at least one cell having the link failure exists, and
the second field indicates reference signal information used to recover a link in a cell having the link failure.

15. The apparatus according to claim 10, wherein the format of the indication information is the second format, and the indication information in the second format comprises one or more of the following information:
a serving cell identifier field, a first field, or a second field, wherein
the serving cell identifier field indicates an identifier of the at least one cell having the link failure by using a bitmap,
the first field indicates whether the second field corresponding to the at least one cell having the link failure exists, and
the second field indicates reference signal information used to recover a link in a cell having the link failure.

16. The apparatus according to claim 10, wherein the indication information in the second format comprises X Ci fields, b first fields, and m second fields, wherein b of the X Ci fields correspond to the b first fields and have a value of 1, and wherein m of the b first fields correspond to the m second fields and have a value of 1.

17. The apparatus according to claim 10, wherein:
the indication information indicates an identifier of the at least one cell having the link failure by using a state value or
a bitmap.

18. The apparatus according to claim 10, wherein:
the situation of the at least one cell having the link failure comprises one or more of: a quantity of cells having the link failure or a valid payload of the information about the at least one cell having the link failure.

19. The apparatus according to claim 10, wherein the apparatus is any one of the following:
a terminal device, a chip, or a chip system.

20. A non-transitory computer-readable storage medium storing one or more instructions executable by at least one processor to perform operations comprising:
determining, based on performing beam failure detection, a link failure in at least one cell; and
sending indication information, wherein the indication information indicates information about the at least one cell having the link failure, wherein a format of the indication information is determined based on a situation of the at least one cell having the link failure, wherein the format of the indication information is a first format or a second format, wherein a quantity of bits occupied by the indication information in the first format is less than a quantity of bits occupied by the indication information in the second format, and wherein the indication information in the first format indicates information about N1 cells having the link failure, and the indication information in the second format indicates information about N2 cells having the link failure, wherein N1 and N2 are integers greater than or equal to 1, and N1<N2.

21. The non-transitory computer-readable storage medium according to claim 20, wherein the situation comprises at least one of: a quantity of serving cells configured with link failure detection or a size of a resource allocated to send the indication information.

22. The non-transitory computer-readable storage medium according to claim 21, wherein the serving cells are configured by a network device and the size of the resource is allocated by the network device.

23. The non-transitory computer-readable storage medium according to claim 20, wherein:
the format of the indication information is the first format, and the indication information in the first format comprises one or more of the following information:
a first field or a second field, wherein
the first field indicates whether a second field corresponding to the at least one cell having the link failure exists, and
the second field indicates reference signal information used to recover a link in a cell having the link failure.

24. The non-transitory computer-readable storage medium according to claim 20, wherein:
the format of the indication information is the second format, and the indication information in the second format comprises one or more of the following information:
a serving cell identifier field, a first field, or a second field, wherein
the serving cell identifier field indicates an identifier of the at least one cell having the link failure by using a bitmap,
the first field indicates whether the second field corresponding to the at least one cell having the link failure exists, and
the second field indicates reference signal information used to recover a link in a cell having the link failure.

25. The non-transitory computer-readable storage medium according to claim 20, wherein the indication information in the second format comprises X Ci fields, b first fields, and m second fields, wherein b of the X Ci fields correspond to the b first fields and have a value of 1, and wherein m of the b first fields correspond to the m second fields and have a value of 1.

* * * * *